United States Patent
Stuckman et al.

(10) Patent No.: US 12,223,462 B2
(45) Date of Patent: Feb. 11, 2025

(54) DRONE DELIVERY DEVICE FOR USE WITH A DRONE DELIVERY SERVICE AND METHODS FOR USE THEREWITH

(71) Applicants: Bruce E. Stuckman, Austin, TX (US); Judith Lynn Stuckman, Austin, TX (US); Katherine C. Stuckman, Menlo Park, CA (US)

(72) Inventors: Bruce E. Stuckman, Austin, TX (US); Judith Lynn Stuckman, Austin, TX (US); Katherine C. Stuckman, Menlo Park, CA (US)

( * ) Notice: Subject to any disclaimer, the term of this patent is extended or adjusted under 35 U.S.C. 154(b) by 0 days.

(21) Appl. No.: 18/544,642

(22) Filed: Dec. 19, 2023

(65) Prior Publication Data
US 2024/0144159 A1 May 2, 2024

Related U.S. Application Data

(63) Continuation of application No. 17/658,726, filed on Apr. 11, 2022, now Pat. No. 11,893,529, which is a
(Continued)

(51) Int. Cl.
*G06Q 10/08* (2024.01)
*G01S 1/00* (2006.01)
(Continued)

(52) U.S. Cl.
CPC ............ *G06Q 10/0832* (2013.01); *G01S 1/00* (2013.01); *G01S 1/02* (2013.01); *G01S 1/0428* (2019.08);
(Continued)

(58) Field of Classification Search
CPC .. G06Q 10/0832; G06Q 10/0833; G01S 1/00; G01S 1/02; G01S 1/0428; G01S 1/68; G01S 1/7038; G06T 19/006
See application file for complete search history.

(56) References Cited

U.S. PATENT DOCUMENTS 5,450,491 A * 9/1995 McNair ............ G06K 19/06028
713/184
9,044,543 B2 6/2015 Levien
(Continued)

FOREIGN PATENT DOCUMENTS

WO 2015061008 4/2015

OTHER PUBLICATIONS

A.H. Meghdadi and P. Irani, "Interactive Exploration of Surveillance Video through Action Shot Summarization and Trajectory Visualization," in IEEE Transactions on Visualization and Computer Graphics, vol. 19, No. 12, pp. 2119-2128, Dec. 2013.
(Continued)

*Primary Examiner* — Cassi J Galt
(74) *Attorney, Agent, or Firm* — Garlick & Markison; Bruce E. Stuckman

(57) ABSTRACT

A system can be used with a drone delivery service that facilitates a service delivery via at least one drone delivery device. The system includes a code generator configured to generate beacon data that identifies a subscriber. A beacon generator is configured to generate a wireless homing beacon that indicates the beacon data, wherein the wireless homing beacon is detectable by the at least one drone delivery device to facilitate the service delivery to the subscriber by the drone delivery device at a location selected by the subscriber and a network interface is configured to communicate via a network. The system receives delivery image data captured after the service delivery by the drone delivery device.

20 Claims, 18 Drawing Sheets

Related U.S. Application Data continuation of application No. 16/891,329, filed on Jun. 3, 2020, now Pat. No. 11,328,246, which is a continuation of application No. 15/970,010, filed on May 3, 2018, now Pat. No. 10,713,612, which is a continuation of application No. 14/620,941, filed on Feb. 12, 2015, now Pat. No. 9,990,601.

(60) Provisional application No. 61/940,680, filed on Feb. 17, 2014.

(51) Int. Cl.
| | |
|---|---|
| *G01S 1/02* | (2010.01) |
| *G01S 1/04* | (2006.01) |
| *G01S 1/68* | (2006.01) |
| *G01S 1/70* | (2006.01) |
| *G01S 19/48* | (2010.01) |
| *G06Q 10/0832* | (2023.01) |
| *G06Q 10/0833* | (2023.01) |
| *G06T 19/00* | (2011.01) |
| *H04N 21/63* | (2011.01) |
| *H04N 23/63* | (2023.01) |

(52) U.S. Cl.
CPC .............. *G01S 1/68* (2013.01); *G01S 1/7034* (2019.08); *G01S 1/7038* (2019.08); *G06Q 10/0833* (2013.01); *G06T 19/006* (2013.01); *H04N 23/63* (2023.01); *G01S 19/485* (2020.05); *G01S 2201/01* (2019.08)

(56) References Cited

U.S. PATENT DOCUMENTS

| | | |
|---|---|---|
| 9,120,568 B2 | 9/2015 | Herman |
| 9,384,668 B2 | 7/2016 | Raptopoulos |
| 2002/0119791 A1 | 8/2002 | Bai |
| 2003/0114206 A1 | 6/2003 | Timothy |
| 2004/0139033 A1 | 7/2004 | Amato |
| 2006/0136236 A1 | 6/2006 | Horton |
| 2006/0166681 A1 | 7/2006 | Lohbihler |
| 2008/0004995 A1 | 1/2008 | Klingenberg |
| 2010/0223173 A1 | 9/2010 | Kadaba |
| 2010/0327066 A1 | 12/2010 | Khan |
| 2011/0320308 A1 | 12/2011 | Dearlove |
| 2013/0132140 A1 | 5/2013 | Amin |
| 2013/0308874 A1 | 11/2013 | Togashi |
| 2014/0032034 A1 | 1/2014 | Raptopoulos |
| 2014/0074743 A1 | 3/2014 | Rademaker |
| 2014/0108136 A1 | 4/2014 | Zhao |
| 2014/0129951 A1 | 5/2014 | Amin |
| 2014/0204360 A1 | 7/2014 | Dowski |
| 2014/0279652 A1 | 9/2014 | Kim |
| 2014/0316841 A1 | 10/2014 | Kilby |
| 2014/0351164 A1 | 11/2014 | Ballenger |
| 2015/0036823 A1 | 2/2015 | Graube |
| 2015/0181200 A1 | 6/2015 | Arrasvuori |
| 2015/0183528 A1 | 7/2015 | Walsh |
| 2015/0186842 A1 | 7/2015 | Daniarov |
| 2017/0011333 A1 | 1/2017 | Greiner |
| 2018/0155011 A1 | 6/2018 | Greiner |

OTHER PUBLICATIONS

Fed Ex Mobile iOS app gets 'Delivery Manager' with customized delivery options, lets users sign for packages Jordan Kahn—Apr. 23, 2013.

* cited by examiner

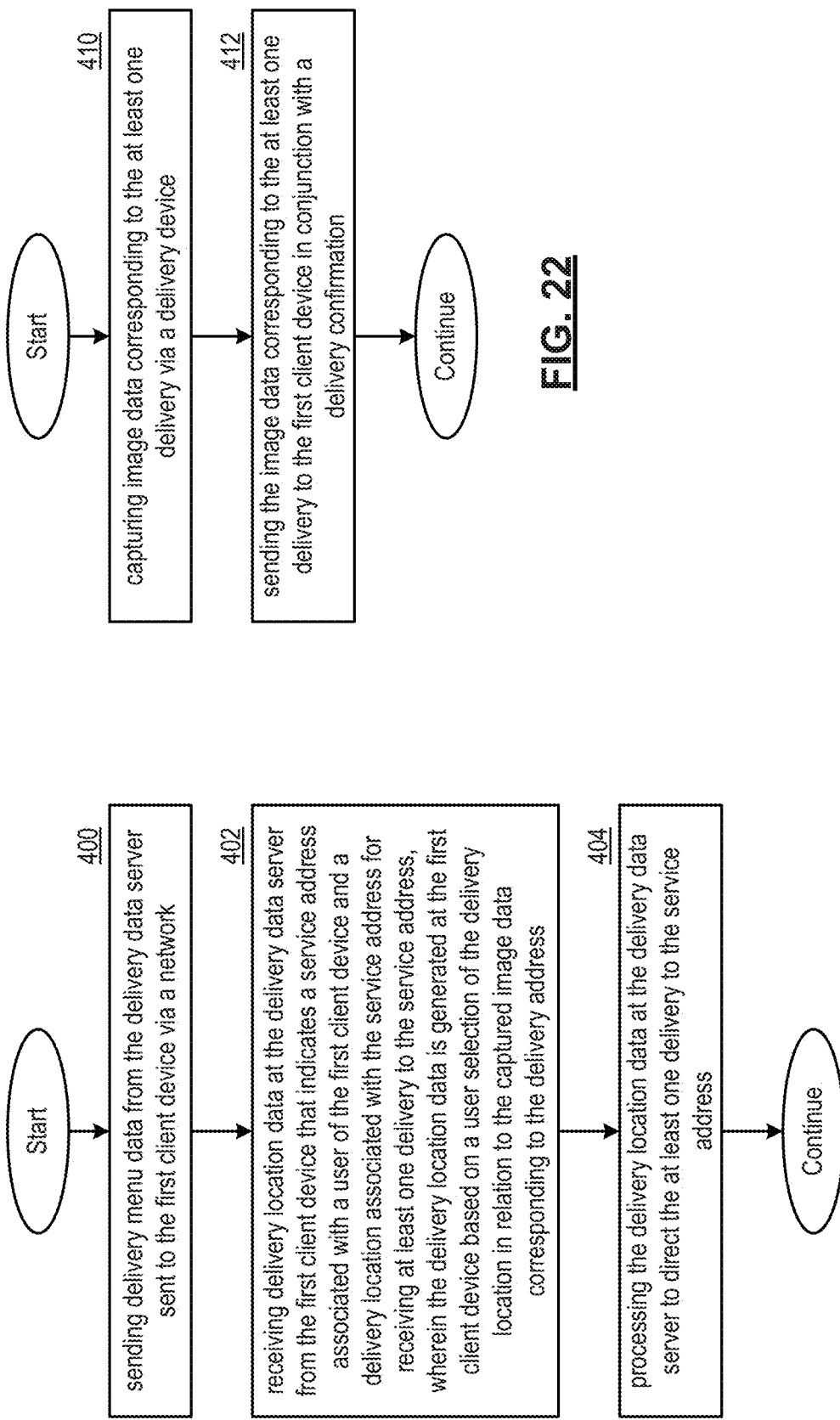

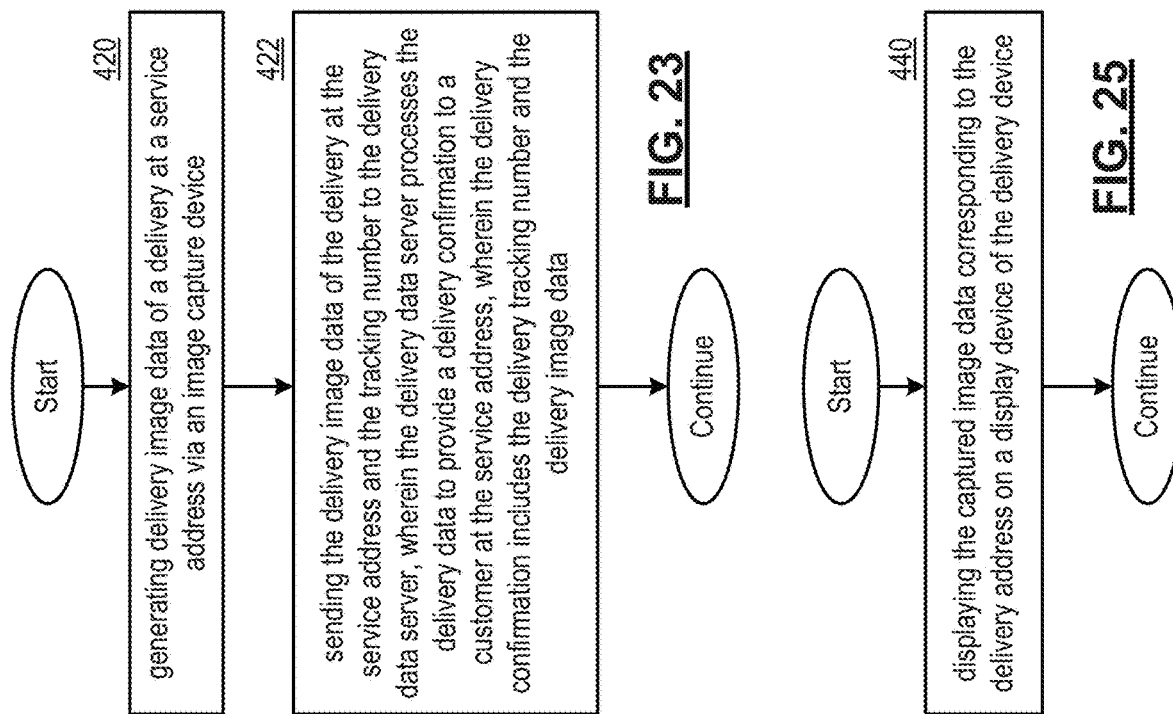

DRONE DELIVERY DEVICE FOR USE WITH A DRONE DELIVERY SERVICE AND METHODS FOR USE THEREWITH

CROSS REFERENCE TO RELATED PATENTS

The present U.S. Utility patent application claims priority pursuant to 35 U.S.C. § 120 as a continuation of U.S. Utility application Ser. No. 17/658,726, entitled "SYSTEM FOR USE WITH A DRONE DELIVERY SERVICE AND METHODS FOR USE THEREWITH", filed Apr. 11, 2022, which is a continuation of U.S. Utility application Ser. No. 16/891,329, entitled "SYSTEM, DELIVERY DEVICE AND METHODS FOR USE THEREWITH", Jun. 3, 2020, issued as U.S. Pat. No. 11,328,246 on May 10, 2022, which is a continuation of U.S. Utility application Ser. No. 15/970,010, entitled "SYSTEM, DELIVERY DEVICE AND METHODS FOR USE THEREWITH", filed May 3, 2018, issued as U.S. Pat. No. 10,713,612 on Jul. 14, 2020, which is a continuation of U.S. Utility application Ser. No. 14/620,941, entitled "SYSTEM, DELIVERY DEVICE AND METHODS FOR USE THEREWITH", filed Feb. 12, 2015, issued as U.S. Pat. No. 9,990,601 on Jun. 5, 2018, which claims priority pursuant to 35 U.S.C. § 119(e) to U.S. Provisional Application No. 61/940,680, entitled "DELIVERY DATA SERVER AND METHODS FOR USE THEREWITH", filed Feb. 17, 2014, all of which are hereby incorporated herein by reference in their entirety and made part of the present U.S. Utility patent application for all purposes.

TECHNICAL FIELD

The present disclosure relates to delivery systems used in conjunction with client/server network architectures.

DESCRIPTION OF RELATED ART

Some delivery companies have adopted online tools to allow customers to perform such functions as to schedule a pickup, calculate shipping fees, print shipping labels, find drop-off points, and track the status of packages in transit. The tracking information can indicate when a package is been received and provide an indication of when it was delivered.

The limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIG. 21 presents a flowchart representation of a method in accordance with an embodiment of the present disclosure.

FIG. 22 presents a flowchart representation of a method in accordance with an embodiment of the present disclosure.

FIG. 23 presents a flowchart representation of a method in accordance with an embodiment of the present disclosure.

FIG. 24 presents a flowchart representation of a method in accordance with an embodiment of the present disclosure.

FIG. 25 presents a flowchart representation of a method in accordance with an embodiment of the present disclosure.

FIG. 26 presents a flowchart representation of a method in accordance with an embodiment of the present disclosure.

DETAILED DESCRIPTION

Figure 1:
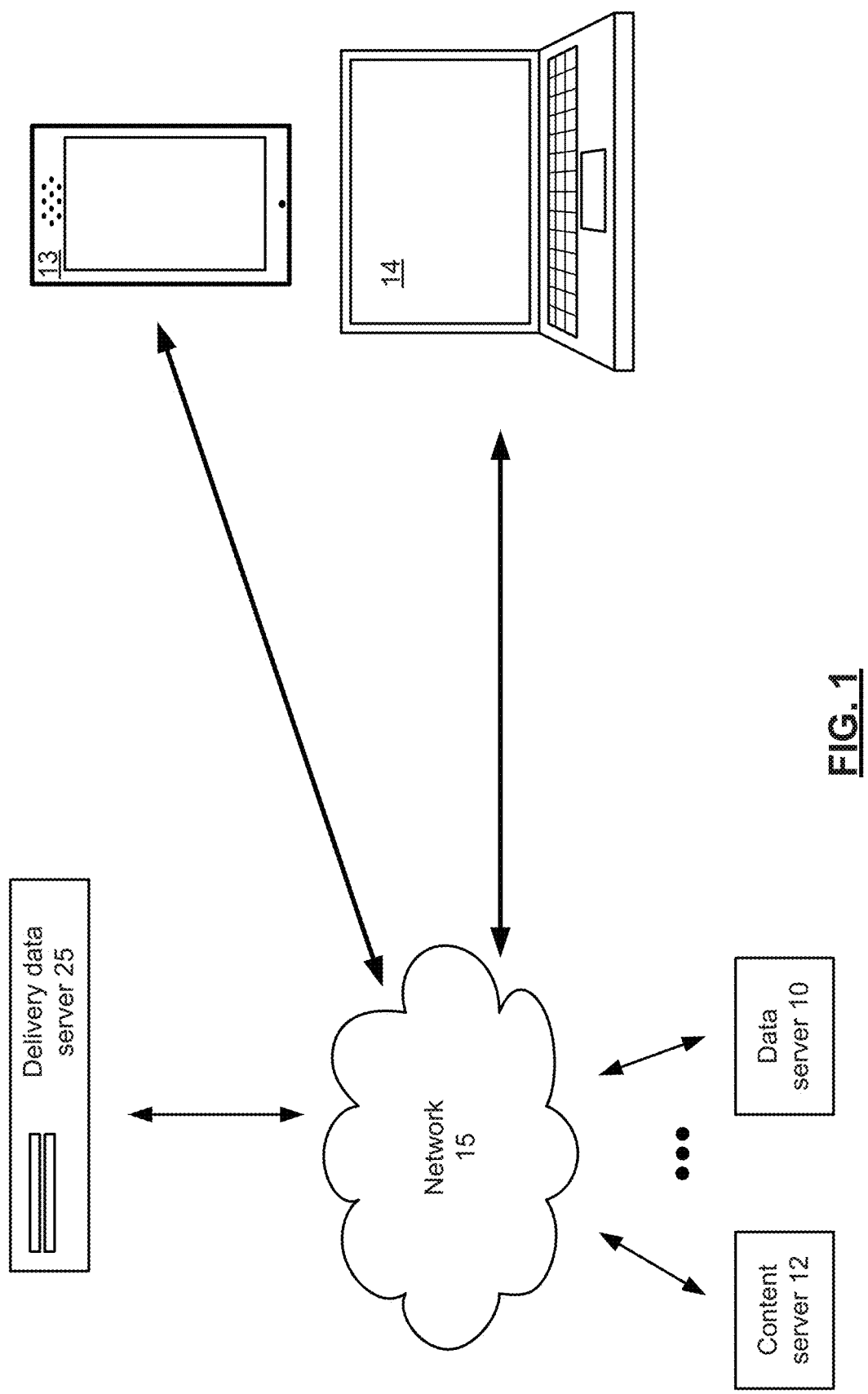
FIG. 1 presents a pictorial representation of a system that includes a delivery data server and example devices 13-14 that operate in accordance with embodiments of the present disclosure.

FIG. 1 presents a pictorial representation of a delivery data server 25 and example devices 13-14 that operate in accordance with embodiments of the present disclosure. In particular, a delivery data server 25 is presented that communicates with client devices such as mobile terminal 13 and personal computer 14 via network 15. The network 15 can include a single network or a plurality of different networks. These network(s) can include the Internet, a private communication network, a local area network, a mobile wireless communication network, a wired or fiber optic network or other broadband communication network.

The delivery data server 25 can present a website that operates via a browser application of mobile terminal 13 and/or personal computer 14 or that otherwise provides a server application that operates in conjunction with a client device having an application such as a mobile application selected for download by the user and downloaded to the client device to present and gather delivery data that includes user data and delivery preferences, delivery location data that indicates a location for deliveries, delivery confirmation data and other data.

In an embodiment, a user such as a residential or business customer can register with the delivery data server 25 to be a subscriber to enhanced services relating to deliveries. The customer/subscriber can log into the delivery data server 25 via an email address or other login ID, and password to access account information, enter preferences and payment information and other information pertaining to delivery services. Delivery data in the form of service menus prompts are presented to the client device for display relating to various information to be entered relating to the delivery services. In an embodiment, the delivery data server 25 communicates with one or more content servers 12 and other data servers 10 such as data servers corresponding to etailers that are the source of goods to be delivered 10 and email server or other electronic messaging server that can communicate messages with the client devices 100 or other data server. These content servers 12 can include a social networking server such as Facebook, My Space, Twitter; a map server that provides map data, image data such as sky view or street view data or other map or image data that is correlated to GPS coordinates or addresses; an advertising server; and other servers that provide information relating to delivery services, to other services, to customers, to neighborhoods, to maps and directions for locating customers, and/or other content. The data servers 10 and content servers 12, can each be a web server or other server that provides data to the delivery data server 25 and/or receives data from the delivery data server 25. While shown as a separate device, the functionality of delivery data server 25 can be implemented in or on conjunction with a particular content server 12 or data server 10 and vice versa.

In one example of operation, a client device 13 or 14 registers with the delivery data server 25. Delivery data is communicated with the delivery data server 25 including delivery preferences, and delivery location data that indicates, for example, the location at the delivery address for deliveries to be made. When the client devices 13 or 14 places an order for goods with a data server 10 to be delivered via the deliver services corresponding to delivery data server 25, and a delivery is initiated to a corresponding subscriber, the delivery location data can be used facilitate the delivery.

Delivery data server 25 and client devices 13 and 14 along with other devices and other aspects of delivery services will be described in greater detail in conjunction with FIGS. 2-27, including several optional functions and features.

Figure 2:
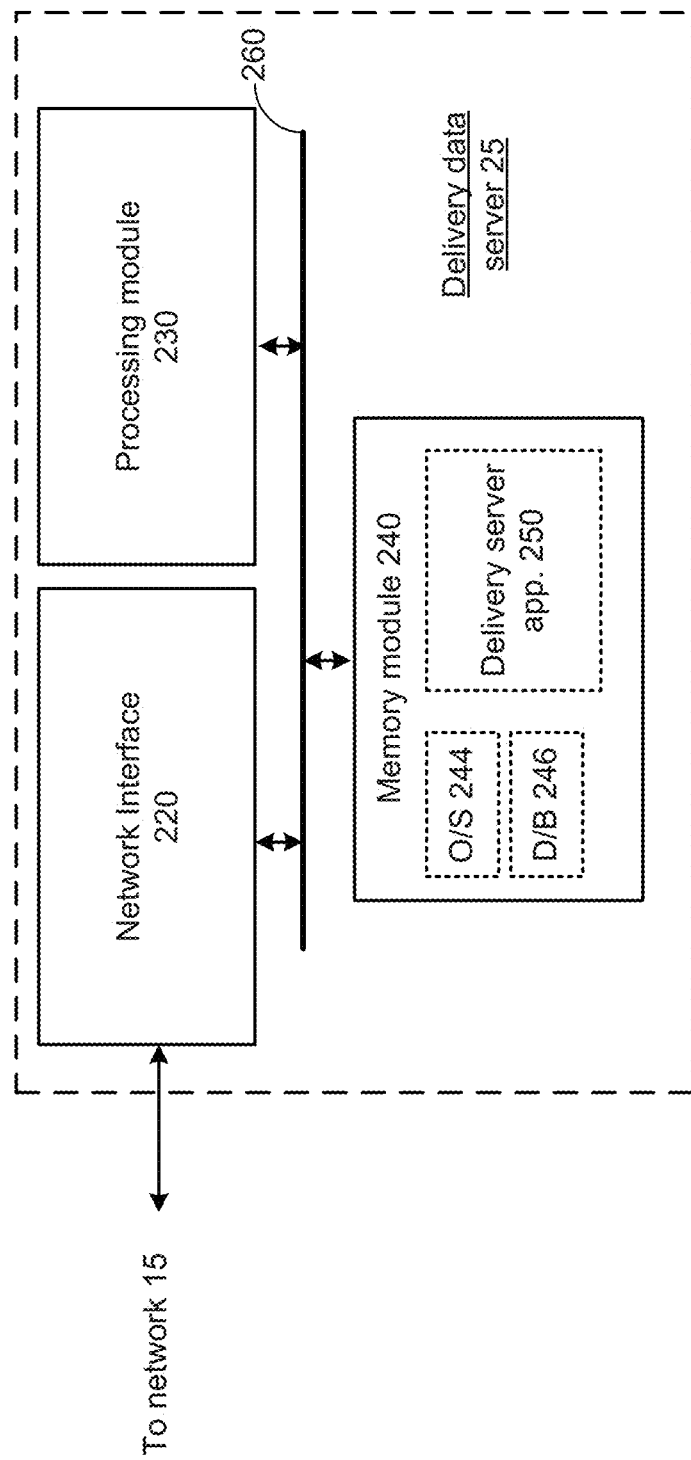
FIG. 2 presents a block diagram representation of a delivery data server 25 in accordance with an embodiment of the present disclosure.

FIG. 2 presents a block diagram representation of a delivery data server 25 in accordance with an embodiment of the present disclosure. In particular, delivery data server 25 includes a network interface 220 such as a network card or modem for communicating with client devices such as client devices 13 or 14, other servers such as content servers 12 and/or data servers 10 via network 15. The delivery data server 25 also includes a processing module 230 and memory module 240 that stores an operating system 244 such as a Linux or Microsoft operating system or other operating system, a database 246 for storing data such as delivery data, subscriber data, other data relating delivery services and other data as well as a delivery data server application 250.

The processing module 230 can be implemented via a single processing device or a plurality of processing devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory 240. The memory can include a hard disc drive or other disc drive, read-only memory, random access memory, volatile memory, non-volatile memory, static memory, dynamic memory, flash memory, cache memory, and/or any device that stores digital information. Note that when a processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 260, other architectures are possible including additional data buses and/or direct connectivity between one or more elements. Further, the delivery data server 25 can include one or more additional elements that are not specifically shown.

At least one processor of the processing module 230 executes the delivery data server application 250 to bidirectionally communicate delivery data with a user of a client device, such as client device 13 or 14 via the network interface 220 and the network 15. In operation, the delivery data server application 250 sends delivery data in the form of delivery menu data, or prompts or other data to a client device, such as client device 13 or 14, via the network 15. The delivery menu data can include screen displays and prompts for the user of client device 13 or 14 to make menu selections to enter text or media or to otherwise interact with the client device 13 or 14 to gather delivery data that is sent to the delivery data server 25. The delivery menu data can also include screen displays that provide other information to client device 13 or 14 or other data communications between the delivery data server 25 and the client device 13 or 14.

In one mode of operation, the processing module 230 executes the delivery data server application 250 to bidirectionally communicate delivery data with a user of a client device 13 or 14 via the network interface 220. The delivery data includes delivery menu data sent to the client device 13 or 14 that prompts the user to enter delivery location data that indicates a service address associated with a user of the first client device and a delivery location associated with the service address for receiving at least one delivery to the service address. The delivery location data indicated by the user is received from the client device 13 or 14 via the network interface 220.

The operation of delivery data server 25 in generating and responding to delivery data will be described in greater detail in conjunction with FIGS. 3-27, including several optional functions and features and other aspects of one or more delivery services.

Figure 3:
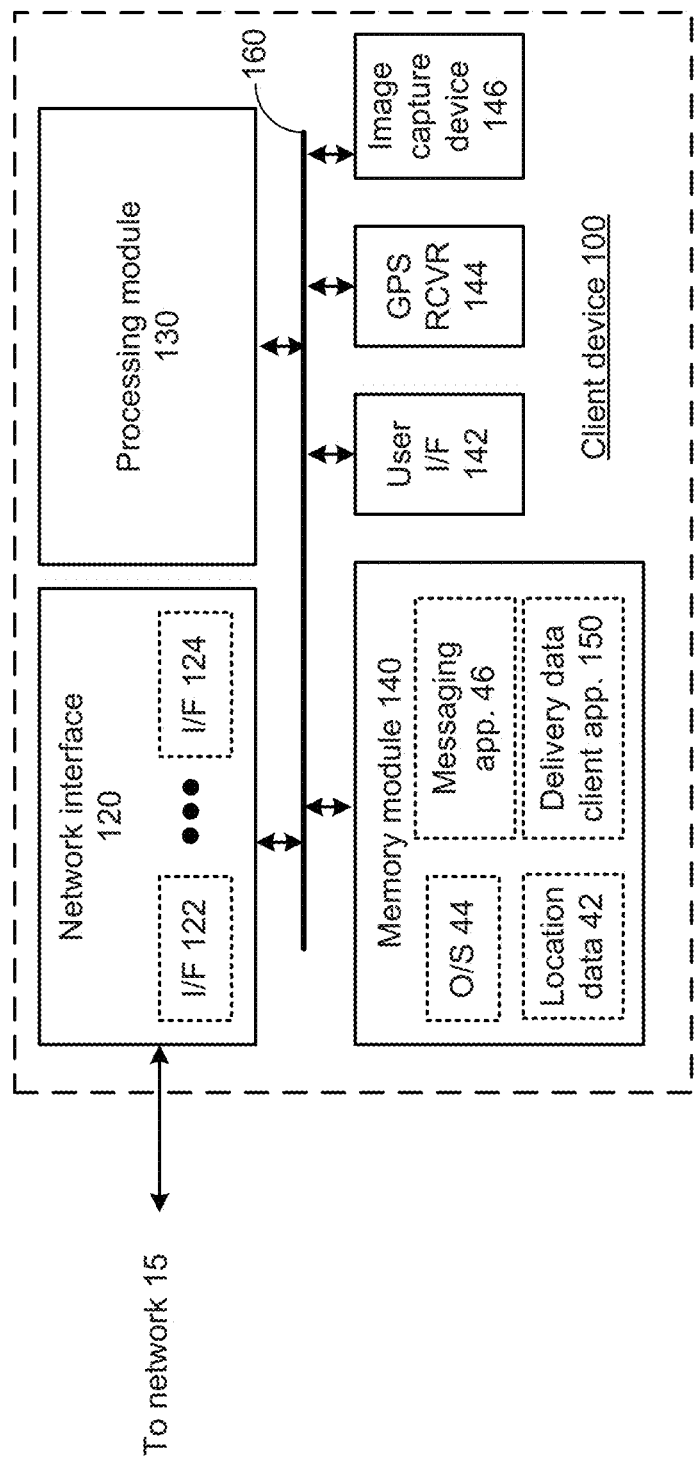
FIG. 3 presents a block diagram representation of a client device 100 in accordance with an embodiment of the present disclosure.

FIG. 3 presents a block diagram representation of a client device 100 in accordance with an embodiment of the present disclosure. In particular, a client device 100, such as mobile terminal 13, personal computer 14 or other client device such as a personal digital assistant, e-reader, tablet, or smartphone is presented. The client device 100 includes a network interface 120 having one or more interfaces (122, 124 . . . ). Examples of interfaces (122, 124 . . . ) include wireless interfaces such as a 3G, 4G or other wireless telephony transceiver, a Bluetooth transceiver, a WiFi transceiver, UltraWideBand transceiver, WIMAX transceiver, ZigBee transceiver or other wireless interface. Examples of interfaces (122, 124 . . . ) further include wired interfaces such as a Universal Serial Bus (USB) interface, an IEEE 1394 Firewire interface, an Ethernet interface or other network card or modem for communicating with delivery data server 25, or other servers such as content servers 12 via network 15. The client device 100 also includes a user interface 142 such as a display device, touch screen, key pad, touch pad, thumb wheel, one or more buttons, a speaker, a microphone, an accelerometer, gyroscope or other motion or position sensor, or other interface devices that provide information to a user of the client device 100 and that generate data in response to the user's interaction with the client device 100. In addition, the client device 100 includes an image capture device 146 such as a digital camera that captures still or video images with or without associated audio.

The client device 100 also includes a processing module 130 and memory module 140 that stores an operating system 44 such as a Linux-based operating system, a Microsoft personal computer or mobile operating system, an Android operating system, an Apple mobile or personal computer operating system or other operating system. The memory module 140 also stores location data 42 corresponding to the location of the client device 100 generated via user interaction with user interface 142, via optional Global Positioning System (GPS) receiver 144, one or more motion sensors such as accelerometers, gyroscopes or other sensors, or gathered via a wireless network such as triangulation data received from a 4G network, location information from a connected access point or base station, femtocell or other location data. In addition, memory module 140 includes a messaging application 46 for communicating with other client devices such as an email application, a text, instant messaging or short messaging service (SMS) application or other messaging application that stored contacts data corresponding to users of other client devices that are known to the user of client device 100 as well as contact information corresponding to message recipients.

The memory module 140 also stores a delivery data client application 150 that is prestored in the memory module, loaded via disk or downloaded to the memory module via network interface 120. The delivery data client application 150 can be a general browser application such as Mozilla, Google Chrome, Safari, Internet Explorer or other general web browser or an application that is customized to operate in conjunction with delivery data server 25 in conjunction with the exchange of delivery data.

The processing module 130 can be implemented via a single processing device or a plurality of processing devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory of memory module 140. The memory can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 160, other architectures are possible including additional data buses and/or direct connectivity between one or more elements. Further, the client device 100 can include one or more additional elements that are not specifically shown.

The operation of client device in generating and responding to delivery data will be described in greater detail in conjunction with FIGS. 4-27, including several optional functions and features and other aspects of one or more delivery services.

Figure 4:
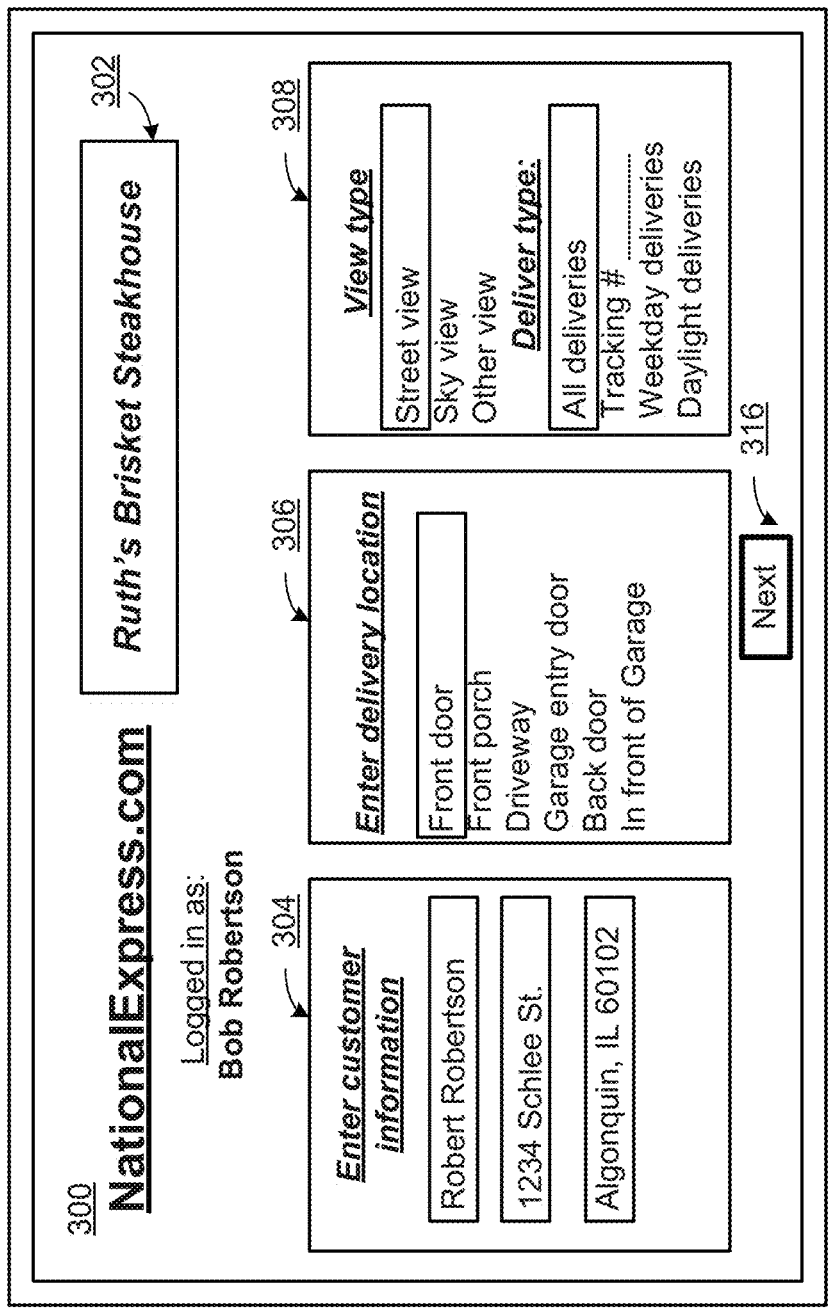
FIG. 4 presents a graphical representation of screen display 300 in accordance with an embodiment of the present disclosure.

FIG. 4 presents a graphical representation of screen display 300 in accordance with an embodiment of the present disclosure. In particular, a screen display 300 of user interface 142 of client device 100 is presented as generated by the delivery data client application 150 in response to delivery data from the delivery data server application 250. As shown, a user, "Bob Robertson" has logged in. This login can, for example, be based on the entry of a username and password, based on a cookie file retrieved from the memory module 240 of the client device 100 or based on other subscription information or authentication procedures.

Delivery location data received from the client device 100 indicates a service address associated with a user of the first client device and a delivery location associated with the service address for receiving at least one delivery to the service address. The screen display 300 is one in a number of different screen displays that guide the user in entering delivery location data and other data relating to delivery services for the user in conjunction with either a particular delivery or with respect to one or more future deliveries at a particular service address.

The screen display 300 includes an ad 302 generated based on data from content server 12, and optionally based on location data 42 received from client device 100 via the network 15 and/or user profile data relating to the user of client device 100 stored in conjunction with user's subscription. In a mode of operation, the ad 302 presents an advertisement pertaining to products or services local to the user and further based on profile data, demographic data or user preferences.

Section 304 provides a graphical user interface for the user to enter customer information in the form of name data that indicates the name or names of customer(s) at the service address and/or service address data that indicates a delivery address where goods are to be delivered by one or more delivery services. Section 306 provides a graphical user interface for the user to enter delivery location data such as a selection of one or more of a plurality of different descriptors of possible delivery locations.

Section 308 provides a graphical user interface for the user to select a specific view type. This selection can be used in a mode of operation where image data corresponding to the delivery address is used to generate location data indicating a one or more delivery locations corresponding to the delivery address. In the embodiment shown, the user can select a street view, sky view or other view such as one or more side views, a back view such as a backyard view of a residential address or other view of the property at the delivery address.

Section 308 also provides a graphical user interface for the user to select a specific delivery type such as deliveries associated exclusively with one or more specific tracking numbers, all delivers to the service address, weekday deliveries, daylight deliveries, etc. While particular options are presented, other delivery types such as weekend deliveries, night time deliveries, differentiation of deliveries by time of day, size and/or shape of the package, value of the package, the day of the week or other delivery types can also be used. Further, different delivery locations can be indicated and stored in a subscriber profile based on the differing delivery types. When a particular delivery corresponding to a delivery type occurs, the delivery service can respond by delivering the package to the location indicated by the delivery type. For example, packages having one or more dimensions that are larger than a dimension threshold can have one selected delivery location while packages not having one or more dimensions that are larger than a dimension threshold can have another selected delivery location. Weekend and weekday deliveries can correspond to different delivery locations. Packages of differing declared values or differing insured values can be assigned to differing locations, etc.

It should be noted that the particular menu structure, screen layout and options are merely illustrative of the many types of delivery data that can be presented and could be selected in accordance with various embodiments of the present disclosure.

In the example shown the names and delivery address have been entered in section 304, a front door delivery location has been selected in section 306, a street view type has been selected along with a delivery type of all deliveries. A next button 316 is presented that, when selected by the user, sends the delivery data entered by the user in accordance with this screen display to the delivery data server 25 via the network 15. In response, the delivery data server 25 can send a new screen display that, if applicable, includes delivery data with additional menu data.

Figure 5:
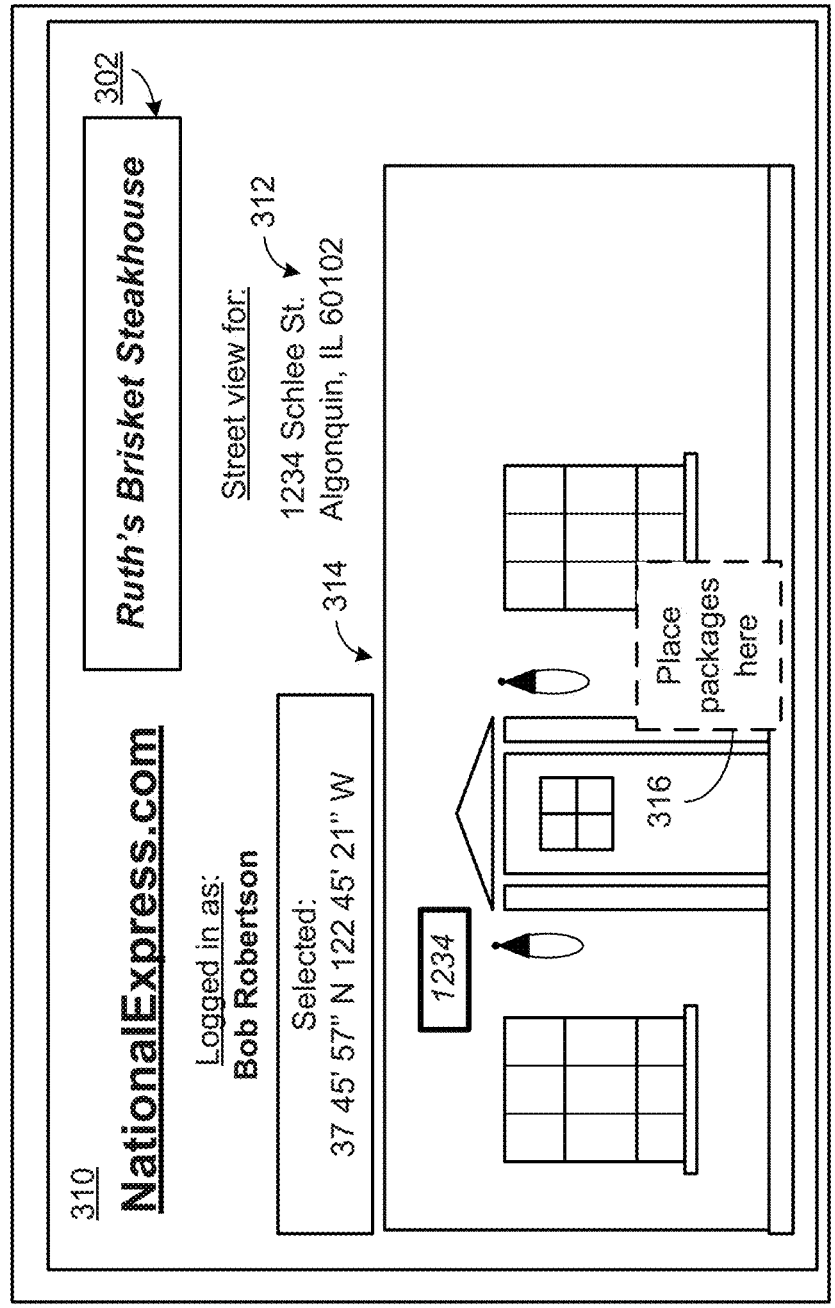
FIG. 5 presents a graphical representation of screen display 310 in accordance with an embodiment of the present disclosure.

FIG. 5 presents a graphical representation of screen display 310 in accordance with an embodiment of the present disclosure. In particular, a screen display 310 of user interface 142 of client device 100 is presented as generated by the delivery data client application 150 in response to delivery data from the delivery data server application 250. Common elements from other figures may be indicated by common reference numerals. The screen display 310 is one in a number of different screen displays that guide the user in entering delivery data relating to deliveries to a particular service address.

Delivery location data received from the client device 100 is generated at the client device 100 based on a user selection of the delivery location in relation to the captured image data corresponding to the delivery address. The delivery location data is sent to the delivery data server 25. The delivery data server application 250 processes the delivery location data to direct one or more deliveries to the service address. In particular captured image data and/or other delivery location data can be used by delivery personnel to place a delivery in a desired delivery location.

The screen display 310 follows an example presented in conjunction with FIG. 4 where a street view was selected by the user and where image data corresponding to the delivery address is used to generate location data indicating a one or more delivery locations corresponding to the delivery address. In the example shown, an image of a street view 314 along with an indication of the delivery address 312 is presented to the user.

In an embodiment, the street view is either retrieved from a database 246 of the delivery data server 25 or from a content server 12 that provides captured image data for different street addresses. In this case, the street address entered by the user in conjunction with display screen 300 is used, along with the selection of street view type to retrieve particular street view image data corresponding to the delivery address. In another embodiment, an image capture device such as a camera integrated with the client device 100 or other digital camera in use by the user can be used to capture the street view image data.

In the example shown, the client device 100 generates the delivery location in relation to the captured image data corresponding to the delivery address based on a superposition of a delivery location icon 316 on the captured image data 314 corresponding to the delivery address. When the captured image data 314 of the street view corresponding to the delivery address is displayed, the user can adjust the position of the delivery location icon 316 via interaction with a mouse, other pointing device or other user interface until the position of the delivery location icon 316 on the captured image data 314 corresponds to the desired delivery location. In the example shown, the user has moved the delivery location icon 316 to a position just to the right of the front door.

Delivery location data that includes the superposition of the delivery location icon 316 on the captured image data 314 is sent to the delivery data server 25 for use by a delivery service person in determining the subscribers desired delivery location. In one mode of operation, the delivery location data is sent to a delivery device associated with a delivery service person. The delivery device displays the superposition of the delivery location icon on the captured image data corresponding to the delivery address to aid the delivery service person in determining the subscribers desired delivery location for a package.

While the example described above has focused on a street view, other views of the property at the delivery address can likewise be employed. In another example, a sky view can be either retrieved from a database 246 of the delivery data server 25 or from a content server 12 that provides captured image data, such as satellite or drone imagery for different street addresses. In this case, the street address entered by the user in conjunction with display screen 300 is used, along with the selection of street view type to retrieve particular sky view image data corresponding to the delivery address. In a further example, an image capture device such as a camera integrated with the client device 100 or other digital camera in use by the user can be used to capture backyard or side view image data corresponding to the delivery address.

In the example shown, the delivery location data includes, in addition or in the alternative, GPS coordinates selected by the client device 100. These GPS coordinates can be generated in different ways. In an embodiment, the client device 100 can be placed at delivery location and the GPS coordinates can be determined by the GPS receiver 144 and captured by the delivery data client application 150 for display on display 310 and inclusion in the location data sent to the delivery data server 25.

In another embodiment, the GPS coordinates can be calculated in conjunction with the positioning of the delivery location icon 316 on the captured image data 314. Consider an example where the captured image data corresponds to a rectangular sky view of the delivery address. Each of the four corners of the sky view can have corresponding GPS coordinates. The positioning of the delivery location icon 316 on the captured image data 314 can be used to generate the GPS coordinates of the desired delivery location by correlating the pixel coordinates of the corners to the GPS coordinates of the corners and by interpolation, based on the pixel coordinates of the delivery location icon 316.

In an embodiment, the positioning of the delivery location icon 316 on the captured image data 314 may be restricted to certain areas of the captured image data 314. Consider an example where the captured image data 314 corresponds to a street view. In this case, the positioning of the delivery location icon 316 may be limited to correspond to a ground level and not an above-ground location. Consider an example where the captured image data 314 corresponds to a sky view. In this case, the positioning of the delivery location icon 316 may be restricted to exclude a roof location, a location corresponding to a pool or locations corresponding to trees, gardens other landscaping or other undesirable delivery locations. In an embodiment, if a restricted delivery location is selected, delivery data can be generated by the delivery data server 25 to indicate that a prior selection corresponded to a restricted location and re-prompt to user to select a new location. In another embodiment, the delivery data client application 150 can receive information relating to allowed or restricted areas and either indicate these restricted areas and/or only allow placement of the delivery location icon 316 in permitted areas.

While an example format for delivery location icon 316 is presented, other delivery location icons including other text, no text, and/or graphic images can likewise be implemented. In an embodiment where the delivery location is being generated based on a particular shipment and information regarding the package size and/or shape is available in conjunction with the particular shipment, the size of the delivery location icon 316 can be sized and/or presented to scale in conjunction with the captured image data 314 to represent the actual size and/or shape of the particular package to be delivered. In this fashion, the user of client device 100 can select a delivery location based on the actual size and shape of a particular package to be delivered.

Figure 6A:
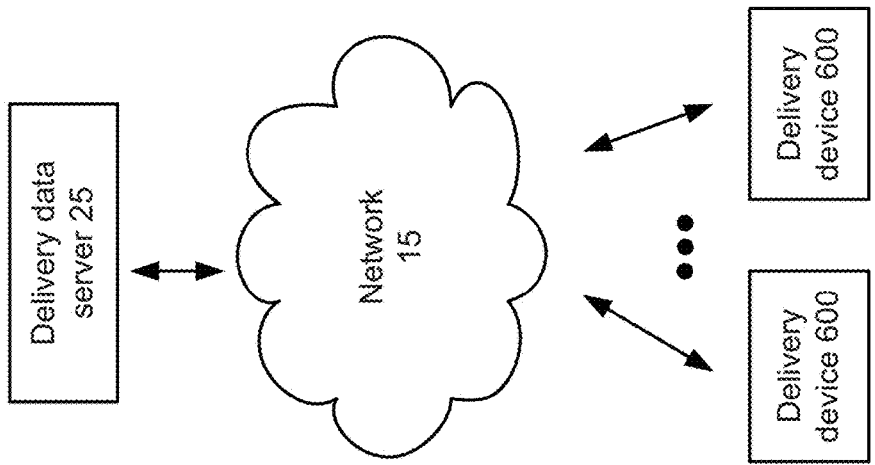
FIG. 6A presents a block diagram representation of a system that includes a delivery data server 25 and delivery devices 600 that operate in accordance with embodiments of the present disclosure.

FIG. 6A presents a block diagram representation of a system that includes a delivery data server 25 and delivery devices 600 that operate in accordance with embodiments of the present disclosure. The delivery devices 600 are each capable of bidirectional communication with the delivery data server 25 via network 15. Each delivery device 600 can be implemented via a handheld communication device that is used by delivery service personnel (the user) in conjunction with a delivery of a package or other goods.

In addition to receiving delivery location data from delivery data server 25 that was generated via interactions with a client device 100, the delivery devices 600 can exchange other delivery data with delivery data server 25 for facilitating deliveries or otherwise providing delivery services to different service addresses.

Figure 6B:
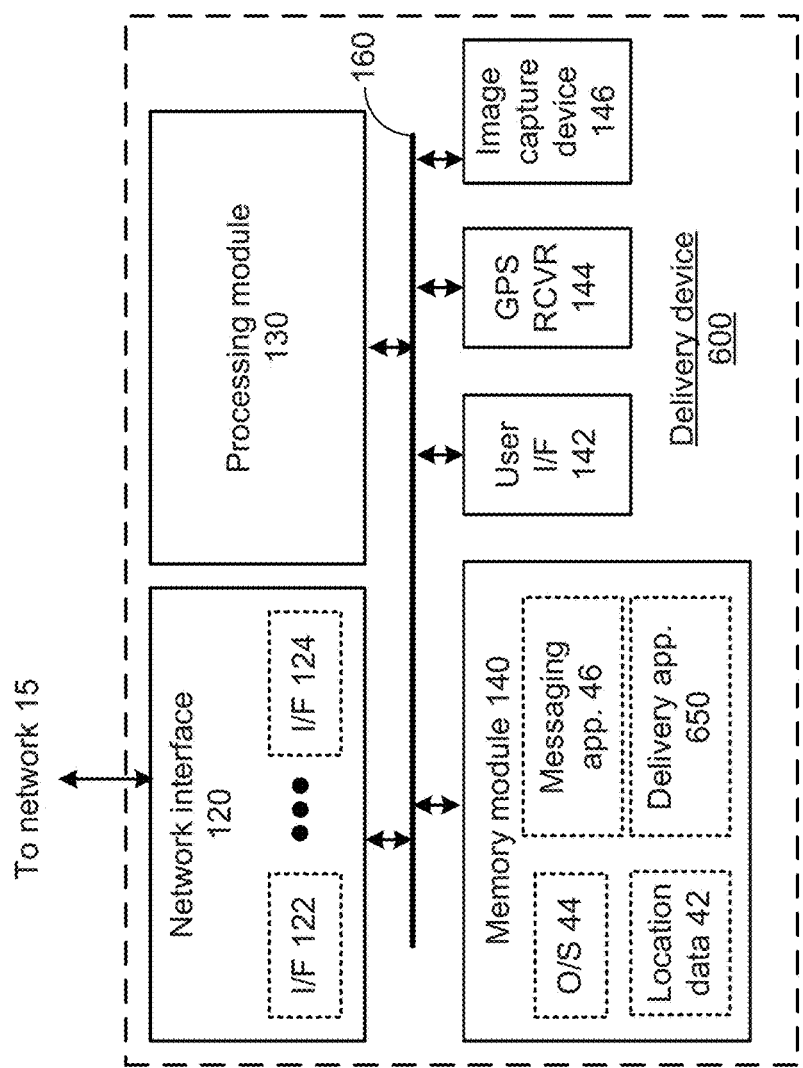
FIG. 6B presents a block diagram representation of a delivery device 600 in accordance with an embodiment of the present disclosure.

FIG. 6B presents a block diagram representation of a delivery device 600 in accordance with an embodiment of the present disclosure. The delivery device 600 includes many common functions and features of client device 100 described in conjunction with FIG. 3 that are referred to by common reference numerals. In particular, a delivery device 600, such as a mobile terminal, personal computer, personal digital assistant, tablet, or smartphone or other delivery device is presented for use by delivery service personnel (the user) in conjunction with a delivery of a package or other goods.

The delivery device 600 includes a network interface 120 having one or more interfaces (122, 124 . . . ). Examples of interfaces (122, 124 . . . ) include wireless interfaces such as a 3G, 4G or other wireless telephony transceiver, a Bluetooth transceiver, a WiFi transceiver, UltraWideBand transceiver, WIMAX transceiver, ZigBee transceiver or other wireless interface. Examples of interfaces (122, 124 . . . ) further include wired interfaces such as a Universal Serial Bus (USB) interface, an IEEE 1394 Firewire interface, an Ethernet interface or other network card or modem for communicating with delivery data server 25, or other servers such as content servers 12 via network 15. The delivery device 600 also includes a user interface 142 such as a display device, touch screen, key pad, touch pad, thumb wheel, one or more buttons, a speaker, a microphone, an accelerometer, gyroscope or other motion or position sensor, or other interface devices that provide information to a user of the delivery device 600 and that generate data in response to the user's interaction with the delivery device 600. In addition, the delivery device 600 includes an image capture device such as a digital camera that captures still or video images with or without associated audio.

The delivery device 600 also includes a processing module 130 and memory module 140 that stores an operating system 44 such as a Linux-based operating system, a Microsoft personal computer or mobile operating system, an Android operating system, an Apple mobile or personal computer operating system or other operating system. The memory module 140 also stores location data 42 corresponding to the location of the client device delivery device 600 generated via user interaction with user interface 142, via optional Global Positioning System (GPS) receiver 144, or gathered via a wireless network such as triangulation data received from a 4G network, location information from a connected access point or base station, femtocell or other location data. In addition, memory module 140 includes a messaging application 46 for communicating with other client devices such as an email application, a text, instant messaging or short messaging service (SMS) application or other messaging application that stored contacts data corresponding to users of other delivery devices 600.

The memory module 140 also stores a delivery application 650 that is prestored in the memory module, loaded via disk or downloaded to the memory module via network interface 120. The delivery application 650 can be a general browser application such as Mozilla, Google Chrome, Safari, Internet Explorer or other general web browser or an application that is customized to operate in conjunction with delivery data server 25. The processing module 130 executes the delivery application 650 to bidirectionally communicate delivery data with a delivery data server via the network interface 120. In addition to receiving delivery location data from delivery data server 25 that was generated via interactions with a client device 100, the delivery devices 600 can exchange other delivery data with delivery data server 25 for facilitating deliveries and providing delivery services to different service addresses.

The processing module 130 can be implemented via a single processing device or a plurality of processing devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory of memory module 140. The memory can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 160, other architectures are possible including additional data buses and/or direct connectivity between one or more elements. Further, the delivery device 600 can include one or more additional elements that are not specifically shown.

In an embodiment, the delivery data received from the delivery data server 25 includes delivery location data generated by a client device that indicates a service address associated with a user of the client device 100 and a delivery location associated with the service address for receiving at least one delivery to the service address. As previously discussed, the delivery location data can indicate a user selection of the delivery location in relation to captured image data corresponding to the delivery address. Further, the delivery location data can indicate the user selection of the delivery location by superposition of a delivery location icon on the captured image data corresponding to the delivery address. In one mode of operation, a display device included in the user interface 142 displays the superposition of the delivery location icon on the captured image data corresponding to the delivery address to aid the delivery service person in identifying the location at the service address to place the package or other delivery.

In another mode of operation, the image capture device 146 captures a live image of the property at the delivery address. The display device of user interface 142 displays a superposition of a delivery location icon on the live image corresponding to the delivery address. The delivery application 650 uses augmented reality techniques to adjust the position of the delivery location icon on the live image to correspond to the delivery location. In an embodiment, the delivery application 650 uses image recognition to correlate the captured live image data to image data that includes the delivery location icon received via location data exchanged between the delivery data server 25 and a client device 100. Portions of the captured live image data that contain the same scene as indicated in the image data of the delivery location data are identified, scaled to match the captured live image data and the position is tracked. The delivery application 650 generates its own delivery location icon that is superimposed in the captured live image data at the proper location corresponding to where the user of the client device placed his or her own delivery location icon 316 in the image 314. In an alternative embodiment, the position and current viewing orientation of the delivery device 600 are determined based on the GPS receiver 144 and/or other position and motion sensors or other position and orientation data generated by the delivery device 600. This position and current viewing orientation are used in conjunction with delivery location data indicating the subscriber's delivery location to adjust the position of a delivery location icon for superposition with the captured live image data.

In an embodiment, the image capture device 146 generates delivery image data of a delivery of the package or other goods at a service address. The memory stores the delivery image data. The delivery data includes a delivery tracking number for a particular delivery along with the delivery image data. The delivery data server 25 receives the delivery data and processes the delivery data to provide a delivery confirmation to a customer at the service address that includes the delivery tracking number and the delivery image data.

The operation of the delivery device 600 in generating and responding to delivery data will be described in greater detail in conjunction with FIGS. 7-27, including several optional functions and features and other aspects of one or more delivery services.

Figure 7A:
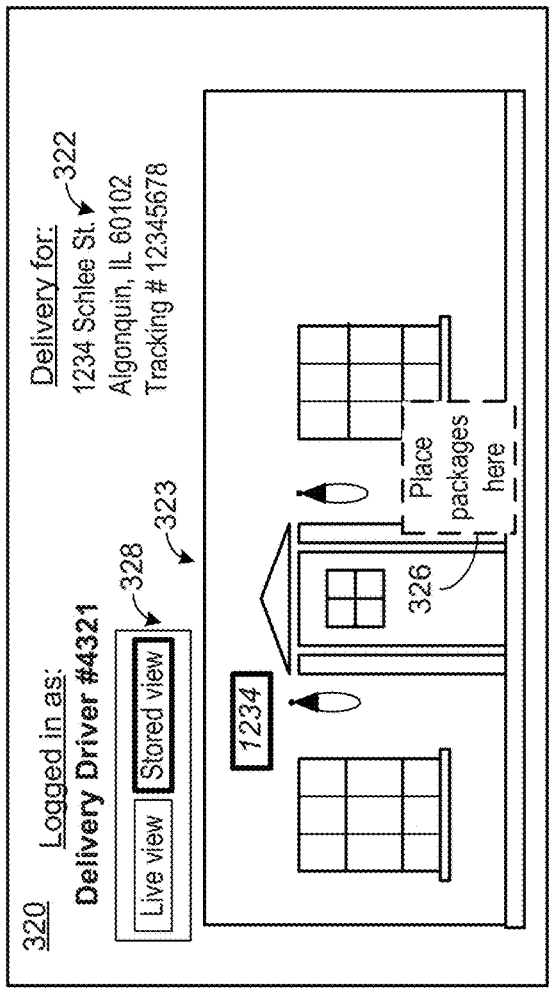
FIGS. 7A and 7B present graphical representations of screen displays 320 and 325 in accordance with embodiments of the present disclosure.
Figure 7B:
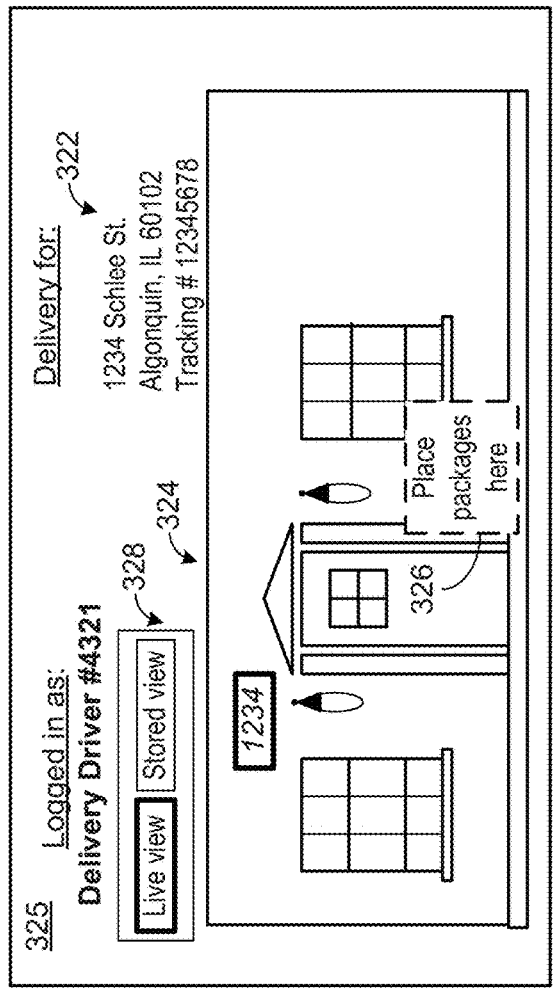

FIGS. 7A and 7B present graphical representations of screen displays 320 and 325 in accordance with embodiments of the present disclosure. In particular, screen displays 320 and 325 of user interface 142 of delivery device 600 are presented as generated by the delivery application 650 in response to delivery data from the delivery data server application 250. Common elements from other figures may be indicated by common reference numerals. The screen displays 320 and 325 are used to guide service personnel in delivering a package or other goods to a delivery location at a particular service address.

As shown in screen display 320, a service person, "Delivery Driver #4321" has logged in. This login can, for example, be based on the entry of a username and password, based on a cookie file retrieved from the memory module 240 of the delivery device 600, based on the use of a secure ID token or based on other subscription information or authentication procedures.

The section 322 includes the service address and the package tracking number. As discussed in conjunction with FIG. 6B, delivery location data from a client device 100 can indicate a user selection of the delivery location in relation to captured image data corresponding to the delivery address by superposition of a delivery location icon on the captured image data corresponding to the delivery address. Screen display 320 presents an example where the user of the delivery device 600 has selected a stored view in region 328. In this mode of operation, the delivery device 600 receives static image data via the delivery data server 25 as selected by the client device 100. The image data includes a static image 323 that includes the superposition of the delivery location icon 326 on a view of the delivery address that was either captured by the client device 100 or forwarded to the client device 100 via the delivery server 25. The delivery person can refer to the static image 323 selected by the subscriber in determining where to place the package.

Screen display 325 presents an example where the user of the delivery device 600 has selected a live view in region 328. In this mode of operation, the delivery device 600 captures a live image 324 of the property at the delivery address. The delivery device 600 displays a superposition of a delivery location icon 326 on the live image corresponding to the delivery address. The delivery device 600 uses augmented reality techniques to adjust the position of the delivery location icon on the live image to correspond to the delivery location. The delivery person can scan the live image 324 at different orientations at the service address to find the delivery location icon 326 in order to determine where to place the package.

Figure 8:
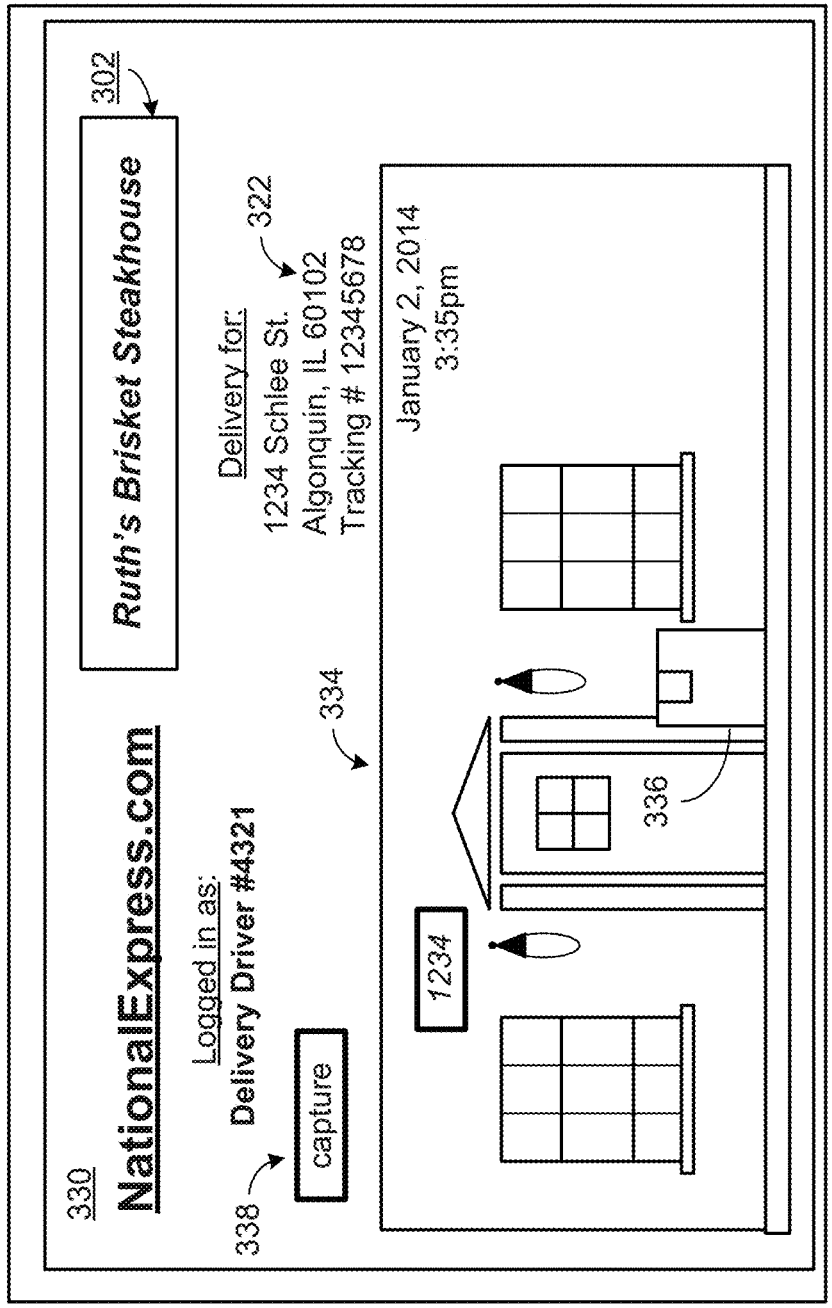
FIG. 8 presents a graphical representation of screen display 330 in accordance with an embodiment of the present disclosure.

FIG. 8 presents a graphical representation of screen display 330 in accordance with an embodiment of the present disclosure. In particular, a screen display 330 of user interface 142 of delivery device 600 is presented as generated by the delivery application 650 in response to delivery data from the delivery data server application 250. Common elements from other FIGS. may be indicated by common reference numerals. The screen display 320 is used by service personnel in delivering a package or other goods to a delivery location at a particular service address.

In particular, region 334 displays a live image of the delivery of a package 336 at a delivery address generated by image capture device 146 of delivery device 600. When a package is delivered the service person captures the image 334 showing the delivery by selecting the capture button 338. The image capture device 146 generates delivery image data of a delivery at a service address corresponding to the image displayed in region 334. As shown, the live image 334 can include the current data and time and the captured images can reflect the date and time the delivery image was captured—corresponding to the date and time of delivery.

In operation, the memory module 140 of delivery device 600 stores the delivery image data and the processing module 130 operates in conjunction with the network interface 120 to send the delivery image data and other information such as the date and time of the delivery, a tracking number associated with the delivery and/or other data to the delivery data server 25. The delivery data server 25 processes the delivery data to provide a delivery confirmation to a customer/subscriber at the service address, wherein the delivery confirmation includes the delivery tracking number and the delivery image data. In this fashion, the customer can review the delivery image data as part of the delivery confirmation to confirm that the package was delivered to his or her address and further to determine the location of the package delivery at the service address.

Figure 9:
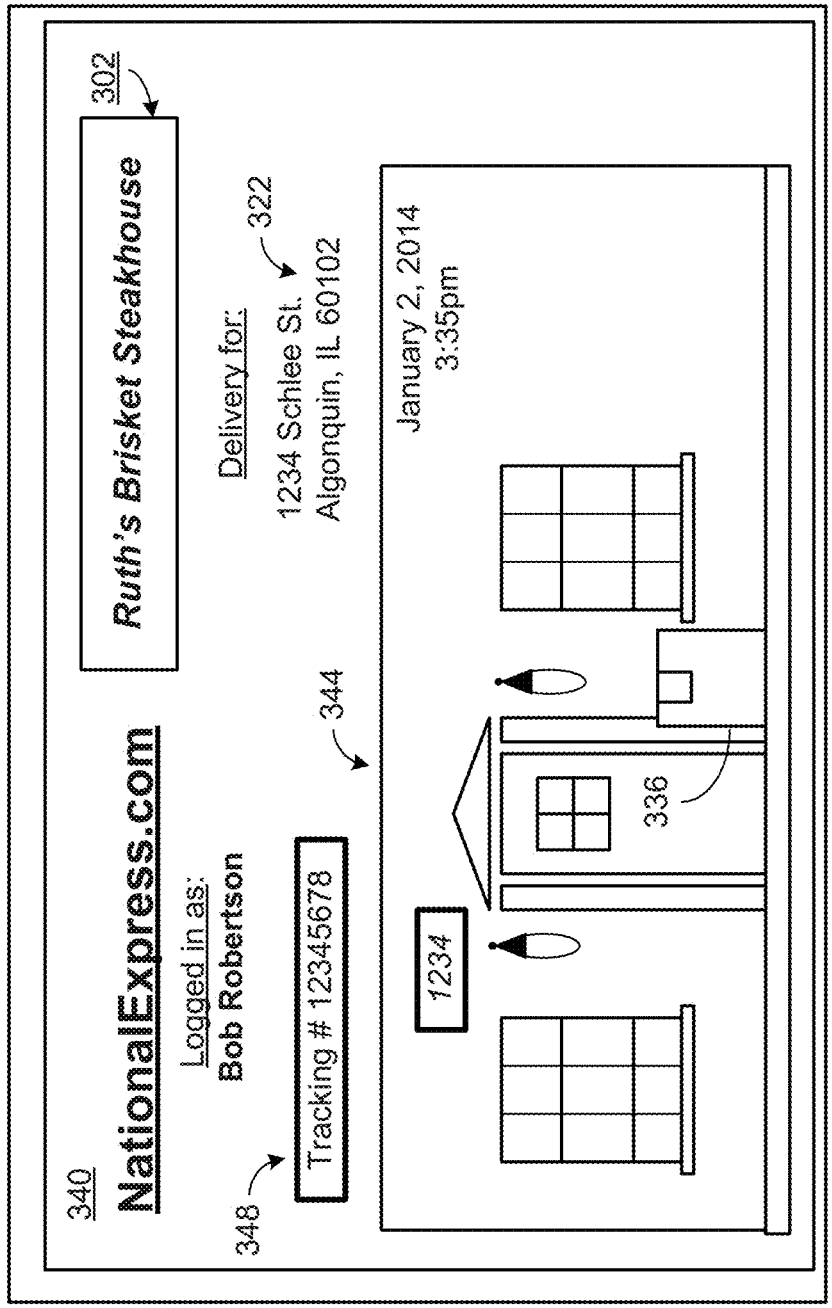
FIG. 9 presents a graphical representation of screen display 340 in accordance with an embodiment of the present disclosure.

FIG. 9 presents a graphical representation of screen display 340 in accordance with an embodiment of the present disclosure. In particular, a screen display 340 of user interface 142 of client device 100 is presented as generated by the delivery data client application 150 in response to delivery data from the delivery data server application 250. Common elements from other figures may be indicated by common reference numerals. The screen display 340 is one in a number of different screen displays relating to deliveries to a particular service address.

In this example, the delivery data includes the captured image data from the delivery device 600 corresponding to the delivery. This captured image data is sent to the client device 100 from the delivery data server 25 in conjunction with a delivery confirmation. When the user Bob Robertson logs in to his account at the delivery data server 25, the delivery confirmation is presented including the tracking number in region 348 and the captured image data 344 corresponding to the delivery.

Figure 10:
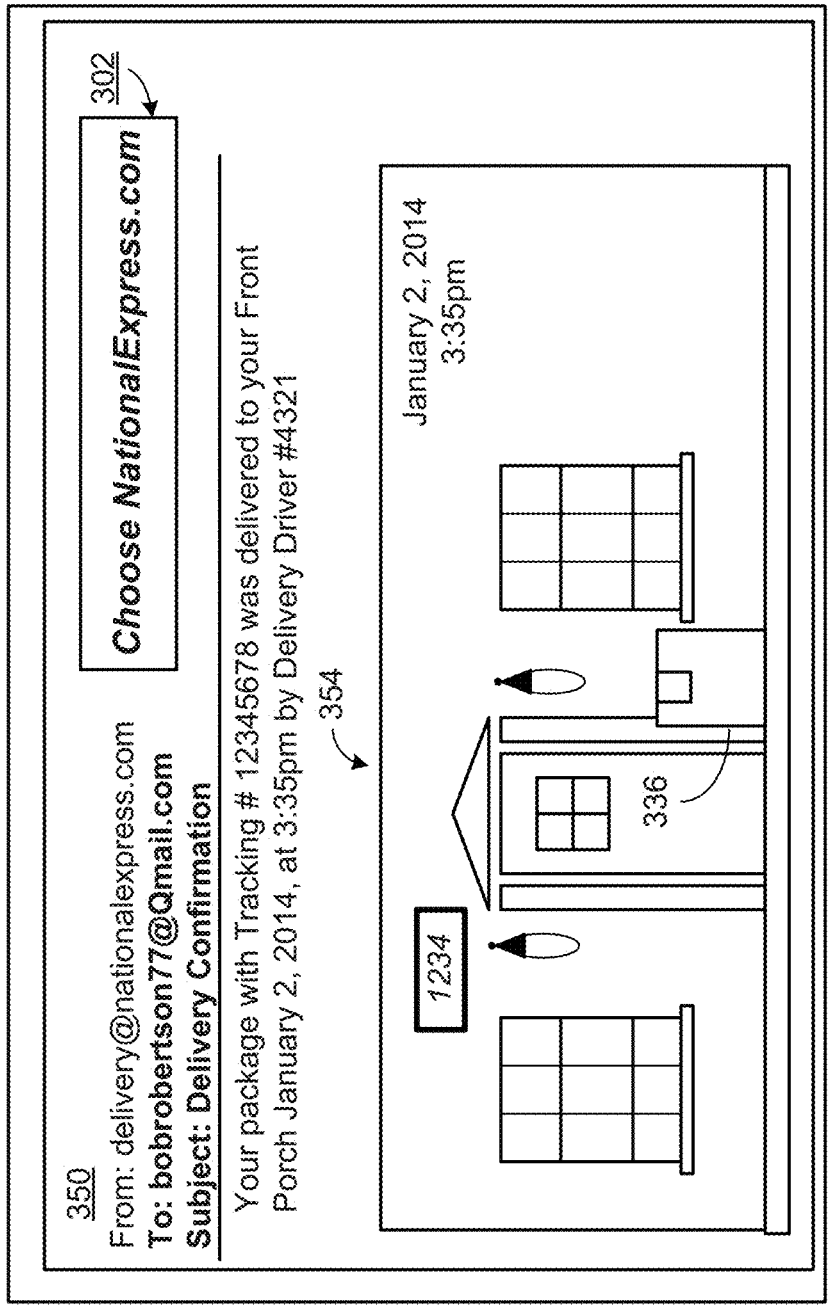
FIG. 10 presents a graphical representation of screen display 350 in accordance with an embodiment of the present disclosure.

FIG. 10 presents a graphical representation of screen display 350 in accordance with an embodiment of the present disclosure. In particular, a screen display 350 of user interface 142 of client device 100 is presented as generated by an electronic messaging application in response to delivery data from the delivery data server application 250 or the delivery device 600. Common elements from other figures may be indicated by common reference numerals.

In this example, the delivery data server 25 or the delivery device 600 sends an electronic message to the client device 100 that includes captured image data corresponding to the delivery in conjunction with a delivery confirmation. The electronic message, such as a media message, email, social media message, text message or other electronic message includes the captured image data from the delivery device 600 corresponding to the delivery. When the user Bob Robertson logs in to his electronic messaging service or otherwise accesses his electronic messages, the electronic message containing the delivery confirmation is presented including the tracking number and the captured image data 354 corresponding to the delivery.

Figure 11:
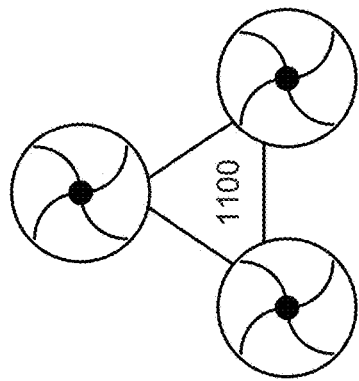
FIG. 11 presents a schematic representation of delivery drone 1100 in accordance with an embodiment of the present disclosure.

FIG. 11 presents a schematic representation of delivery drone 1100 in accordance with an embodiment of the present disclosure. While the prior disclosure has focused on deliveries by service personnel, many of the prior techniques apply to deliveries by a drone delivery device 1100 such as a drone aircraft 1100, autonomous road vehicle or combination thereof. In particular, delivery location data created by a subscriber that identifies a delivery location at a service address can be sent via a network to a drone delivery device 1100 that delivers packages and other goods to the service address. In operation, the drone delivery device 1100 locates the delivery location based on the delivery location data.

The use of a drone delivery device 1100 easily permits use of a delivery location at a backyard location associated with a residential address that may be behind a gate, in a locked area or otherwise to areas that may be more secure than other delivery locations and/or may not be readily available to traditional service persons. In addition, the drone delivery devices can optionally be configured to capture image data corresponding to the delivery that can be used in conjunction with a delivery confirmation as presented in conjunction with FIGS. 9 and 10.

In an embodiment, the network interface 120 includes a transceiver that includes a 802.11x or other wireless local area network (WLAN) transceiver that communicates with an access point (AP) associated with the service address. In one mode of operation, the subscriber provides the system identification and/or password associated with the AP. When the delivery drone 1100 comes in range of the AP, it associates with the AP for bidirectional communications with a customer client device 13 or 14 via the AP such as communications relating to the particular delivery being attempted by the drone delivery device, status communications indicating that delivery is in progress, that delivery has been made, direct communication of delivery image data captured after the delivery by the drone delivery device, prompts for a signature confirmation, receipt of a delivery confirmation and other communications. While these bidirectional communications are described above in conjunction with a local area network, other network communications such text messages, instant messages, email messages or other electronic messaging via a cellular data network or other wireless networks, with or without the Internet can also be employed.

Figure 12:
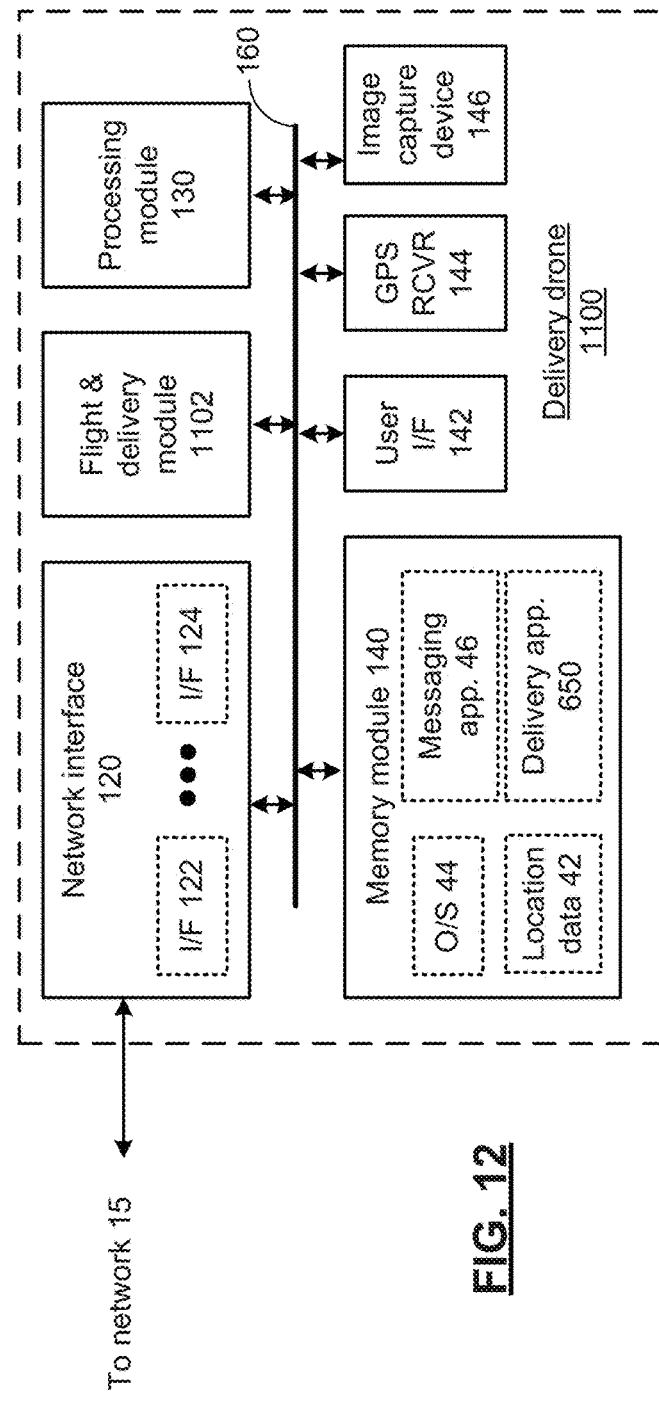
FIG. 12 presents a block diagram representation of delivery drone 1100 in accordance with an embodiment of the present disclosure.

FIG. 12 presents a block diagram representation of delivery drone 1100 in accordance with an embodiment of the present disclosure. The drone delivery device 1100 includes many common functions and features of client device 100 and delivery device 600 described in conjunction with FIG. 3 that are referred to by common reference numerals. In particular, a drone delivery device 1100 is presented for use by delivery service personnel (the user) in conjunction with a delivery of a package or other goods.

The drone delivery device 1100 includes a network interface 120 having one or more interfaces (122, 124 . . . ). Examples of interfaces (122, 124 . . . ) include wireless interfaces such as a 3G, 4G or other wireless telephony transceiver, a Bluetooth transceiver, a WiFi transceiver, UltraWideBand transceiver, WIMAX transceiver, ZigBee transceiver or other wireless interface. Examples of interfaces (122, 124 . . . ) further include wired interfaces such as a Universal Serial Bus (USB) interface, an IEEE 1394 Firewire interface, an Ethernet interface or other network card or modem for communicating with delivery data server 25, or other servers such as content servers 12 via network 15.

The drone delivery device 1100 also includes a user interface 142 such as a display device, touch screen, key pad, touch pad, thumb wheel, one or more buttons, a speaker, a microphone, an accelerometer, gyroscope or other motion or position sensor, or other interface devices that provide information to a user of the drone delivery device 1100 such as one or more service persons and that generate data in response to the user's interaction with the drone delivery device 1100. It should be noted, that while the user interface 142 is shown as integrated in the drone delivery device 1100, the user interface 142 could be a separate unit that is coupled to the drone delivery device 1100 via network interface 120. In this fashion, a smartphone, tablet, personal computer or dedicated device could serve as a user interface 142 for the drone delivery device 1100 to upload programming, route information, destination information and/or other commands and further to download data such as a delivery image data containing delivery images, route tracking information and other data.

In addition, the drone delivery device 1100 includes an image capture device such as a digital camera that captures still or video images with or without associated audio. This image capture device can be used by the drone delivery device 1100 to capture delivery image data used in a delivery confirmation, to provide visual feedback to the drone delivery device 1100 to assist in locating the delivery location, to assist the drone delivery device 1100 in obstacle avoidance including the avoidance of in-flight obstacles and determination of whether or not the delivery location is free of obstacles such as people, pets, debris or other obstacles for delivery of the package or other goods to the delivery location.

The drone delivery device 1100 also includes a processing module 130 and memory module 140 that stores an operating system 44 such as a Linux-based operating system, a Microsoft personal computer or mobile operating system, an Android operating system, an Apple mobile or personal computer operating system or other operating system. The memory module 140 also stores location data 42 corresponding to the location of the drone delivery device 1100 via optional Global Positioning System (GPS) receiver 144 and/or other motion sensors such as an accelerometer, gyroscope, ultrasonic position sensor, altimeter or other sensor, or gathered via a wireless network such as triangulation data received from a 4G network, location information from a connected access point or base station, femtocell or other location data.

In addition, memory module 140 includes a messaging application 46 for communicating with client devices, delivery devices 600 or other drone delivery devices 1100 such as an email application, a text, instant messaging or short messaging service (SMS) application or other messaging application that stores contacts data corresponding to customers, service persons and other users associated with a drone delivery service.

The flight and delivery module 1102 includes a controllable lift mechanism such as a plurality of rotors and flight controls for controlling the flight of the drone delivery device 1100 to effectuate a delivery. In addition, the flight and delivery module includes a controllable package bay or other grasping mechanism to hold a package or other good during flight and to disengage the package or good when the drone delivery device 1100 arrives at the delivery location.

The memory module 140 also stores a delivery application 650 that is prestored in the memory module, loaded via disk or downloaded to the memory module via network interface 120. The processing module 130 executes the delivery application 650 to bidirectionally communicate delivery data with a delivery data server 25 via the network interface 120. In addition to receiving delivery location data from delivery data server 25 that was generated via interactions with a client device 100, the drone delivery device 1100 can exchange other delivery data with delivery data server 25 for facilitating deliveries to different service addresses.

The processing module 130 can be implemented via a single processing device or a plurality of processing devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory of memory module 140. The memory can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 160, other architectures are possible including additional data buses and/or direct connectivity between one or more elements. Further, the drone delivery device 1100 can include one or more additional elements that are not specifically shown.

In an embodiment, the delivery data received from the delivery data server 25 includes delivery location data generated by a client device that indicates a service address associated with a user of the client device and a delivery location associated with the service address for receiving at least one delivery to the service address. As previously discussed, the delivery location data can indicates a user selection of the delivery location in relation to captured image data corresponding to the delivery address. The delivery location data can include a service address, GPS coordinate of the delivery location at the service address and/or the captured image data of the delivery location. In one mode of operation, the drone delivery device 1100 can use the service address and or GPS coordinates initially to locate the vicinity of the delivery location. When in the vicinity of the delivery location, the image capture device 146 can be used by the drone delivery device 1100 in conjunction with the captured image data corresponding to the delivery address to aid the drone delivery device 1100 in identifying the location at the service address to place the package or other delivery.

In another mode of operation, the image capture device 146 of the drone delivery device 1100 generates delivery image data of a delivery of the package or other goods at a service address. After delivery, the drone delivery device 1100 orients itself, such as by recognizing captured image data relating to the package or goods that were just delivered, to take a picture of the package or other goods at the actual delivery location. The memory stores the delivery image data. The delivery data includes a delivery tracking number for a particular delivery along with the delivery image data. The delivery data server 25 receives the delivery data and processes the delivery data to provide a delivery confirmation to a customer at the service address that includes the delivery tracking number and the delivery image data.

Figure 13:
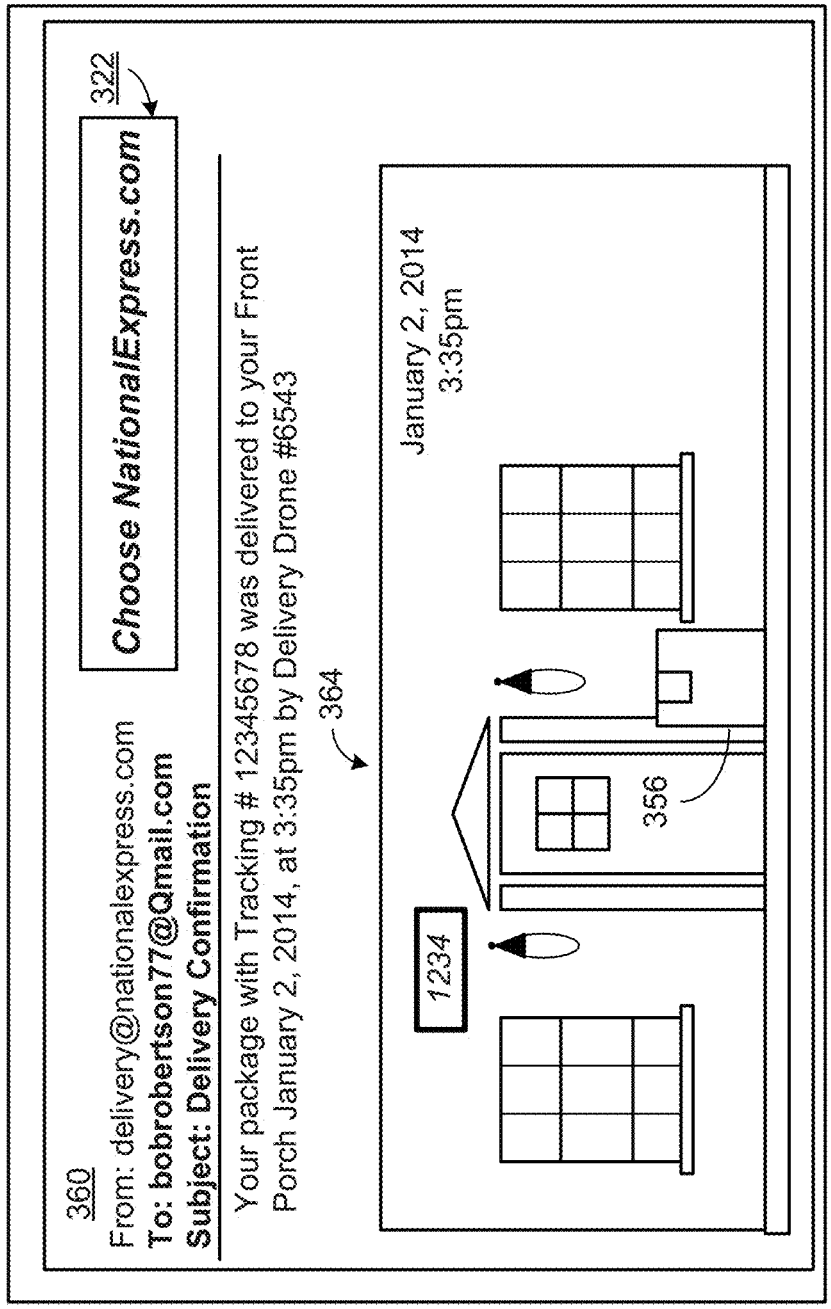
FIG. 13 presents a graphical representation of screen display 360 in accordance with an embodiment of the present disclosure.

FIG. 13 presents a graphical representation of screen display 360 in accordance with an embodiment of the present disclosure. In particular, a screen display 360 of user interface 142 of client device 100 is presented as generated by an electronic messaging application in response to delivery data. Common elements from other figures may be indicated by common reference numerals.

In this example, the delivery data server 25 or the drone delivery device 1100 sends an electronic message to the client device 100 that includes captured image data corresponding to the delivery in conjunction with a delivery confirmation. The electronic message, such as a media message, email, social media message, text message or other electronic message includes the captured image data from the drone delivery device 1100 corresponding to the delivery. When the user Bob Robertson logs in to his electronic messaging service or otherwise accesses his electronic messages, the electronic message containing the delivery confirmation is presented including the tracking number and the captured image data 364 corresponding to the delivery.

It should be noted, that while the delivery confirmation corresponding to the drone delivery of the package 354 is presented in conjunction with an electronic message, the captured image data 364 could likewise be conveyed in other ways including by access to the subscriber's account via delivery data server 25 as described in conjunction with FIG. 9.

Figure 14:
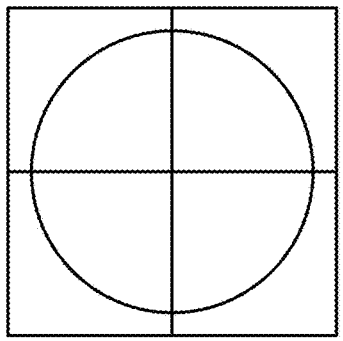
FIG. 14 presents a pictorial representation of delivery mat 1400 in accordance with an embodiment of the present disclosure.

FIG. 14 presents a pictorial representation of delivery mat 1400 in accordance with an embodiment of the present disclosure. In particular a delivery mat 1400 is presented for use in conjunction with a drone delivery device 1100 or other delivery drone.

In this embodiment, the delivery mat 1400 is provided to a customer to receive one or more drone deliveries. The user places the delivery mat in a desired delivery location at their service address. The delivery mat 1400 includes a visible landing target that can be used by a drone delivery device 1100 or other delivery drone to more precisely locate the delivery location at the service address.

As previously discussed, delivery location data provided to the drone delivery device 1100 can include a service address and/or GPS coordinates of the delivery location at the service address. In one mode of operation, the drone delivery device 1100 can use the service address and or GPS coordinates initially to locate the vicinity of the delivery location. When in the vicinity of the delivery location, the image capture device 146 can be used by the drone delivery device 1100 to aid the drone delivery device 1100 in identifying the location at the service address to place the package or other delivery. In particular, image recognition performed via the delivery application 650 can recognize the presence or absence of the delivery target in a captured field of view and further can be used in a pattern search or other search to locate the delivery mat and further to home in on the location of the delivery mat.

Figure 15:
FIG. 15 presents a pictorial representation of delivery mat 1500 in accordance with an embodiment of the present disclosure.

FIG. 15 presents a pictorial representation of delivery mat 1500 in accordance with an embodiment of the present disclosure. In particular a delivery mat 1500 is presented for use in conjunction with a drone delivery device 1100 or other delivery drone.

In this embodiment, the delivery mat 1500 is provided to a customer to receive one or more drone deliveries. The user places the delivery mat in a desired delivery location at their service address. The delivery mat 1500 includes a visible landing target that can be used by a drone delivery device 1100 or other delivery drone to more precisely locate the delivery location at the service address. The visible landing target includes a visible two-dimensional code such as a bar code or other two-dimensional code that uniquely identifies the subscriber.

As previously discussed, delivery location data provided to the drone delivery device 1100 can include a service address and/or GPS coordinates of the delivery location at the service address. In one mode of operation, the drone delivery device 1100 can use the service address and or GPS coordinates initially to locate the vicinity of the delivery location. When in the vicinity of the delivery location, the image capture device 146 can be used by the drone delivery device 1100 to aid the drone delivery device 1100 in identifying the location at the service address to place the package or other delivery. In particular, image recognition performed via the delivery application 650 can recognize the presence or absence of the delivery target in a captured field of view and further can be used in a pattern search or other search to locate the delivery mat. The drone delivery device 1100 can confirm the association of the package or goods to be delivered with the particular delivery mat by recognizing the two-dimensional code and associating the two-dimensional code with either the particular delivery or the subscriber and, when recognized, visually homing in on the location of the delivery mat.

Figure 16:
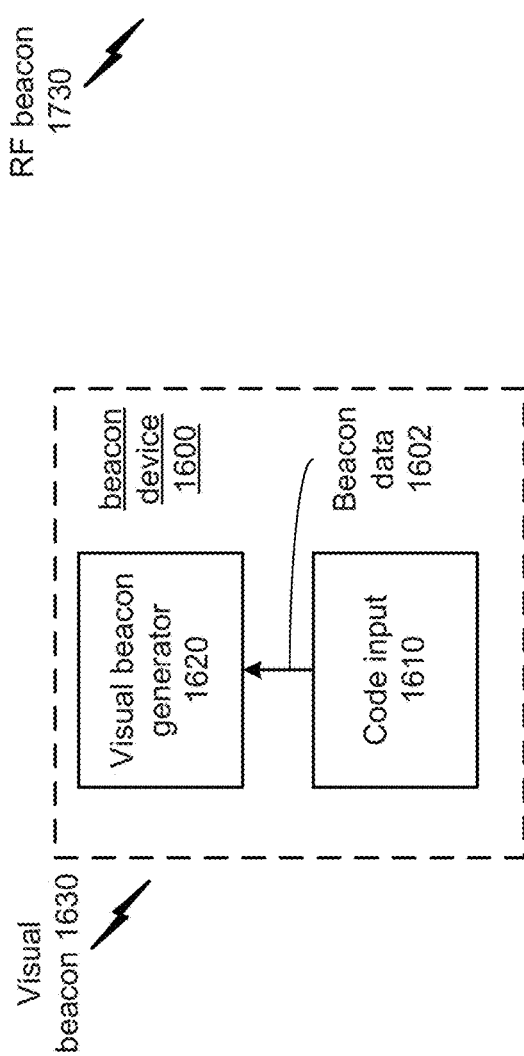
FIG. 16 presents a block diagram representation of beacon device 1600 in accordance with an embodiment of the present disclosure.

FIG. 16 presents a block diagram representation of beacon device 1600 in accordance with an embodiment of the present disclosure. In particular a beacon device 1600 is presented for use in conjunction with a drone delivery device 1100 or other delivery drone.

In this embodiment, the beacon device 1600 is provided to a customer to receive one or more drone deliveries. The user places the beacon device 1600 in a desired delivery location at their service address. The beacon device 1600 generates a visible beacon 1630 that can be used by a drone delivery device 1100 or other delivery drone to more precisely locate the delivery location at the service address.

The beacon device includes a beacon code generator 1610 that generates beacon data 1602 that uniquely indicates a subscriber. The beacon generator generates a wireless homing beacon, such as visual beacon 1630 that indicates the beacon data 1602. The wireless homing beacon 1630 is detectable by the drone delivery device to facilitate a service delivery by the drone delivery device at the location of the beacon device 1600.

In an embodiment, the visual beacon 1630 is a visible signal, such as a visible light wave, a near infrared light wave, in infrared beacon or other visible or non-visible signal that is modulated via the beacon data 1602 and that can be optically detected via an image capture device, such as image capture device 146. The beacon code generator 1610 can includes a linear feedback shift register that generates a pseudo random code sequence that is unique to the subscriber or pseudo-unique. The beacon data 1602 includes the pseudo random code sequence that is recognized by the drone delivery device for authentication with either the delivery or the delivery customer. In another configuration, the beacon code generator 1610 includes a security token module that generates a rolling sequence of encryption codes. The beacon data 1602 includes the rolling sequence of encryption codes that is recognized by the drone delivery device for authentication with either the delivery or the delivery customer. In a further configuration the beacon data 1602 includes a low density parity check code that is recognized by the drone delivery device for authentication with either the delivery or the delivery customer.

As previously discussed, delivery location data provided to the drone delivery device 1100 can include a service address and/or GPS coordinates of the delivery location at the service address. In one mode of operation, the drone delivery device 1100 can use the service address and or GPS coordinates initially to locate the vicinity of the delivery location. When in the vicinity of the delivery location, the image capture device 146 can be used by the drone delivery device 1100 to aid the drone delivery device 1100 in identifying the location at the service address to place the package or other delivery. In particular, image recognition performed via the delivery application 650 can recognize the presence or absence of the visual beacon 1630 in a captured field of view and further can be used in a pattern search or other search to locate the visual beacon 1630. The drone delivery device 1100 can confirm the association of the package or goods to be delivered with the particular visual beacon 1630 by authenticating the subscriber or delivery based on extracting the beacon data 1602 via demodulation. When the visual beacon 1630 is recognized, the delivery drone 1100 can visually home in on the location of the beacon device 1600.

It should be noted that the beacon device 1600 can be used with or without a delivery mat such as delivery mat 1400 or 1500. When employed, the location of delivery mat 1400 or 1500 can be used in conjunction with the beacon device 1600 to more precisely determine the delivery location and indicate the spot where the package or other goods should be placed in the vicinity of the beacon device 1600.

Figure 17:
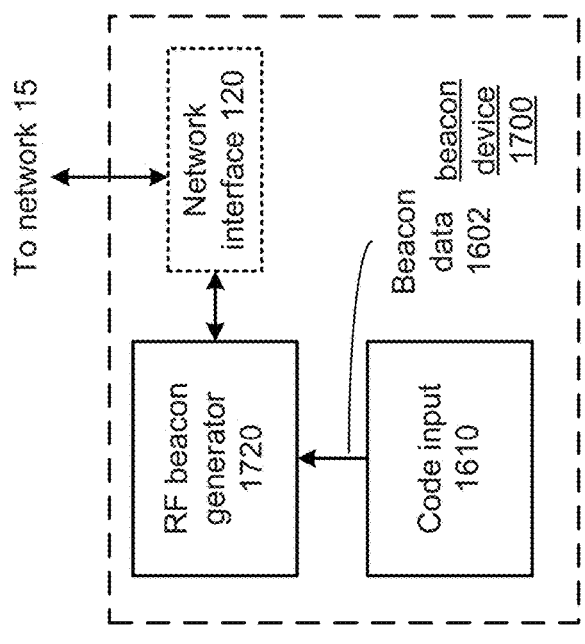
FIG. 17 presents a block diagram representation of beacon device 1700 in accordance with an embodiment of the present disclosure.

FIG. 17 presents a block diagram representation of beacon device 1700 in accordance with an embodiment of the present disclosure. In particular a beacon device 1700 is presented for use in conjunction with a drone delivery device 1100 or other delivery drone.

In this embodiment, the beacon device 1700 is provided to a customer to receive one or more drone deliveries. The user places the beacon device 1700 in a desired delivery location at their service address. The beacon device 1700 generates a radio frequency (RF) beacon 1730 that can be used by a drone delivery device 1100 or other delivery drone to more precisely locate the delivery location at the service address.

The beacon device includes a beacon code generator 1610 that generates beacon data 1602 that uniquely indicates a subscriber. The beacon generator generates a wireless homing beacon, such as RF beacon 1730 that indicates the beacon data 1602. The wireless homing beacon is detectable by the drone delivery device to facilitate a service delivery by the drone delivery device at the location of the beacon device 1700.

In an embodiment, the beacon code generator 1610 can include a linear feedback shift register that generates a pseudo random code sequence that is unique to the subscriber or pseudo-unique. The beacon data 1602 includes the pseudo random code sequence that is recognized by the drone delivery device for authentication with either the delivery or the delivery customer. In another configuration, the beacon code generator 1610 includes a security token module that generates a rolling sequence of encryption codes. The beacon data 1602 includes the rolling sequence of encryption codes that is recognized by the drone delivery device for authentication with either the delivery or the delivery customer. In a further configuration the beacon data 1602 includes a low density parity check code that is recognized by the drone delivery device for authentication with either the delivery or the delivery customer.

As previously discussed, delivery location data provided to the drone delivery device 1100 can include a service address and/or GPS coordinates of the delivery location at the service address. In one mode of operation, the drone delivery device 1100 can use the service address and or GPS coordinates initially to locate the vicinity of the delivery location. When in the vicinity of the delivery location, the image capture device 146 can be used by the drone delivery device 1100 to aid the drone delivery device 1100 in identifying the location at the service address to place the package or other delivery. In particular, an RF receiver or transceiver included in the delivery device can be used to receive the RF beacon 1730. In an embodiment, the RF receiver or transceiver generates a signal strength indication and a directional beam antenna that can be used by the drone delivery device 1100 to estimate the distance and direction to the beacon device 1700. The drone delivery device 1100 can confirm the association of the package or goods to be delivered with the particular RF beacon 1730 by authenticating the subscriber or delivery based on extracting the beacon data 1602 via demodulation. When the RF beacon 1730 is recognized, the delivery drone 1100 can home in on the location of the beacon device 1700.

It should be noted that the beacon device 1700 can be used with or without a delivery mat such as delivery mat 1400 or 1500. When employed, the location of delivery mat 1400 or 1500 can be used in conjunction with the beacon device 1700 to more precisely determine the delivery location and indicate the spot where the package or other goods should be placed in the vicinity of the beacon device 1700.

In an embodiment, the RF beacon generator 1620 is implemented via an RF transceiver that can bidirectionally communicate data with a drone delivery device such as drone delivery device 1100. In an embodiment, the RF transceiver includes an antenna array or other directional antenna that can be used to provide directional feedback data to the drone delivery device to aid in locating the beacon device 1700 by the drone delivery device. The data communication between the beacon device 1700 and the drone delivery device can include packet transmissions and acknowledgements, including handshake signaling, communication to the beacon device of 1700 relating to the particular delivery being attempted by the drone delivery device, status communications indicating that delivery is in progress, that delivery has been made, direct communication of delivery image data captured after the delivery by the drone delivery device and other communications.

The beacon device 1700 optionally contains a network interface 120 that permits the beacon device 1700 to communicate with the subscriber/customer. For example, the network interface can include a wireless local area network transceiver such as an 802.11a,b,g,n,ac . . . (802.11x) compatible device that is associated with an access point at the customer premises. In this fashion, status communications indicating that delivery is in progress, that delivery has been made, direct communication of delivery image data captured after the delivery by the drone delivery device and other communications can be sent directly via electronic messaging to a client device associated with the subscriber/customer.

Figure 18:
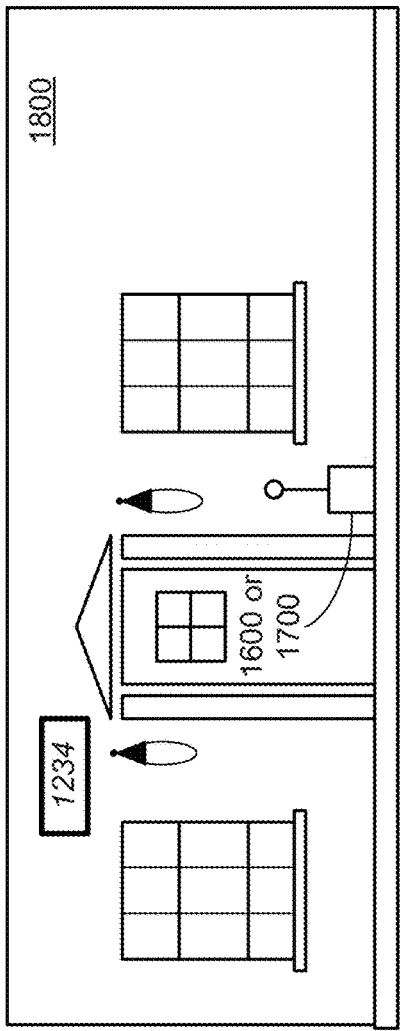
FIG. 18 presents a pictorial representation of street view 1800 in accordance with an embodiment of the present disclosure.

FIG. 18 presents a pictorial representation of street view 1800 in accordance with an embodiment of the present disclosure. In this embodiment, a beacon device 1600 or 1700 is provided to a customer to receive one or more drone deliveries. The user places the beacon device 1600 or 1700 in a desired delivery location at their service address. The beacon device 1600 or 1700 generates a wireless beacon that can be used by a drone delivery device 1100 or other delivery drone to more precisely locate the delivery location at the service address.

As discussed in conjunction with FIGS. 16 and 17, the beacon device 1600 or 1700 can be used with or without a delivery mat such as delivery mat 1400 or 1500. When employed, the location of delivery mat 1400 or 1500 can be used in conjunction with the beacon device 1600 or 1700 to more precisely determine the delivery location and indicate the spot where the package or other goods should be placed in the vicinity of the beacon device 1600 or 1700.

Figure 19:
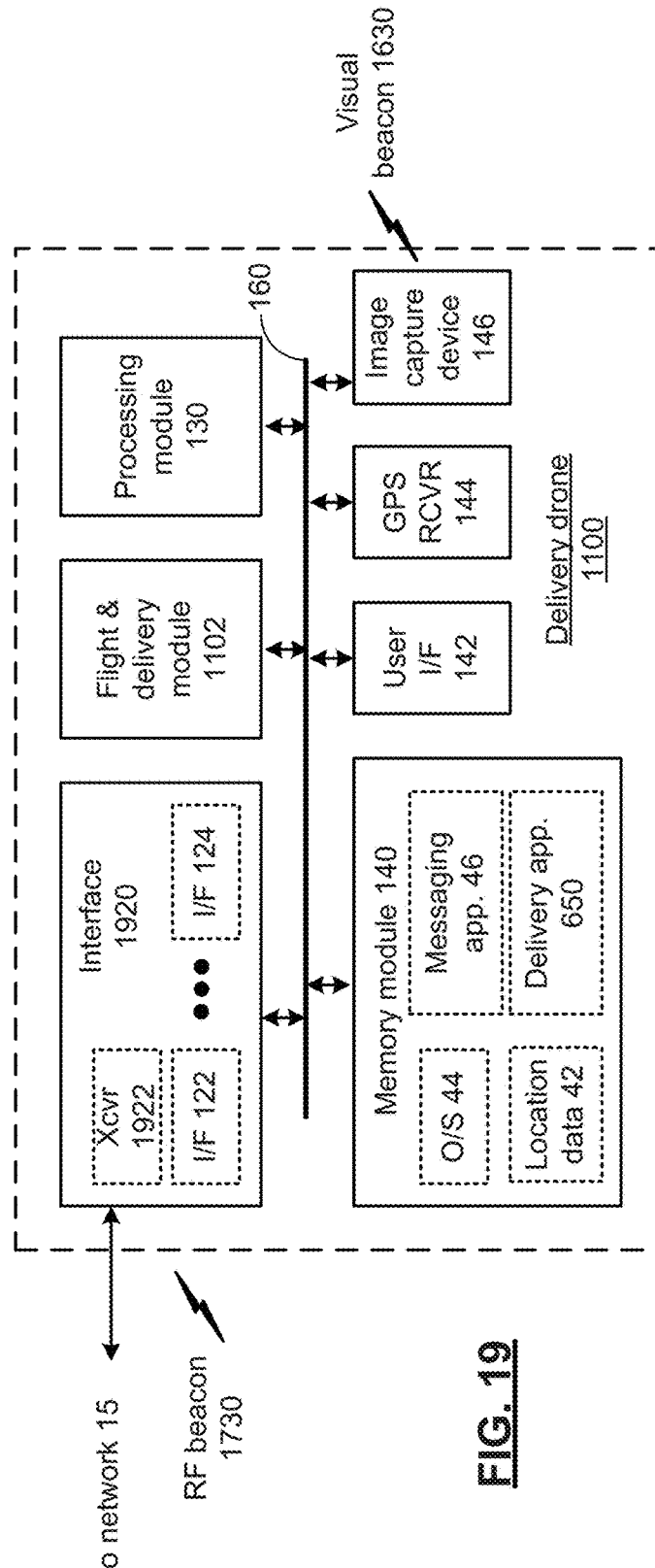
FIG. 19 presents a block diagram representation of delivery drone 1100 in accordance with another embodiment of the present disclosure.

FIG. 19 presents a block diagram representation of delivery drone 1100 in accordance with another embodiment of the present disclosure. A delivery drone is presented that includes similar elements described in conjunction with FIGS. 1-18 that are referred to by common reference numerals. In addition, interface 1920 includes interface 122, 124 . . . and a RF transceiver 1922 for receiving and demodulating the RF beacon 1730 and/or communicating with beacon device 1700.

In the embodiment, RF transceiver 1922 can bidirectionally communicate data with a beacon device 1700 or other communication device at the premises of the service address. The data communication between the beacon device 1700 and the drone delivery device 1100 can include packet transmissions and acknowledgements, including handshake signaling, communication to the beacon device of 1700 relating to the particular delivery being attempted by the drone delivery device, status communications indicating that delivery is in progress, that delivery has been made, direct communication of delivery image data captured after the delivery by the drone delivery device and other communications. In a mode of operation, the drone delivery device 1100 communicates with a customer at the service address to prompt the customer for a real-time signature confirmation and receives the real-time signature confirmation from the customer as a condition precedent to completing the delivery.

In an embodiment, the RF transceiver 1922 of other transceiver that includes a 802.11x or other WLAN transceiver that communicates with an access point (AP) associated with the either the beacon device 1700 or otherwise with the service address. In one mode of operation, the subscriber provides the system identification and/or password associated with the AP. When the delivery drone 1100 comes in range of the AP, it associates with the AP for bidirectional communications with a client device 100 of the customer/subscriber via the AP such as communications relating to the particular delivery being attempted by the drone delivery device, status communications indicating that delivery is in progress, that delivery has been made, direct communication of delivery image data captured after the delivery by the drone delivery device, prompts for a signature confirmation, receipt of a delivery confirmation and other communications.

Figure 20:
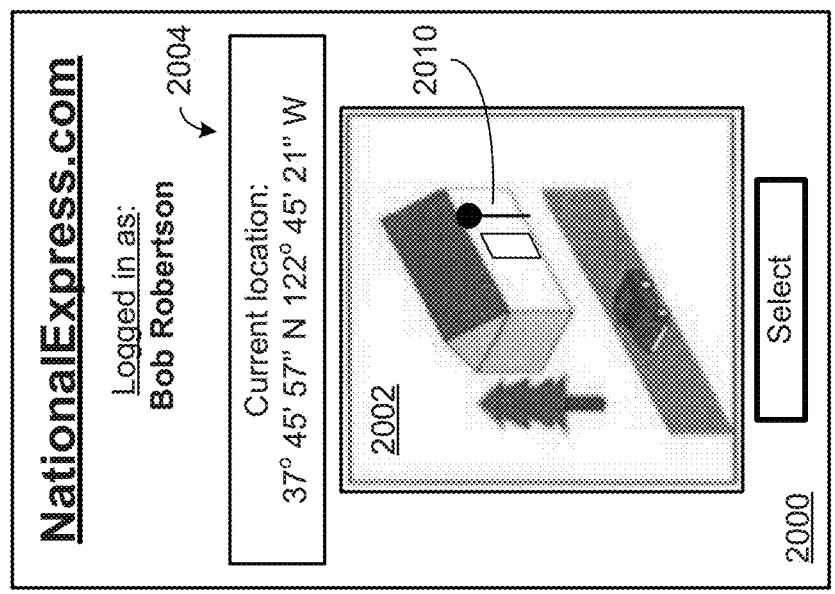
FIG. 20 presents a graphical representation of screen display 2000 in accordance with an embodiment of the present disclosure.

FIG. 20 presents a graphical representation of screen display 2000 in accordance with an embodiment of the present disclosure. In particular, a screen display 2000 of user interface 142 of client device 100 is presented as generated by the delivery data client application 150 in response to delivery data from the delivery data server application 250. Common elements from other figures may be indicated by common reference numerals. The screen display 2000 is one in a number of different screen displays that guide the user in entering delivery data relating to deliveries to a particular service address.

Delivery location data received from the client device 100 is generated at the client device 100 based on a user selection of the delivery location at the service address based on captured GPS coordinates. In this embodiment, the user of the client device 100 takes the client device to the delivery location. The GPS receiver 144 generates GPS coordinates that are displayed in region 2004 of the display based on the operation of delivery data client application 150. In addition, delivery data client application 150 displays a map view 2002 of the immediate area based on map data stored on the client device 100 or received via delivery data server 25 and/or a content server 12 that contains a map database. The map data can include satellite imagery, street views, virtual maps, or other maps. The current location of the client device 100 indicated by the GPS coordinates can be indicated by the pin indicator 2010 or other indicator. The delivery location data is sent to the delivery data server 25. The delivery data server application 250 processes the delivery location data to direct one or more deliveries to the service address. In particular captured image data and/or other delivery location data can be used by delivery personnel to place a delivery in a desired delivery location.

While the example described above has focused on a street view, other map views of the property at the delivery address can likewise be employed. In another example, a sky view is either retrieved from a database 246 of the delivery data server 25 or from a content server 12 that provides captured image data, such as satellite or drone imagery for different street addresses.

FIG. 21 presents a flowchart representation of a method in accordance with an embodiment of the present disclosure. In particular, a method is presented for use with one or more of the functions and features described in conjunction with FIGS. 1-20. Step 400 includes sending delivery menu data from the delivery data server sent to the first client device via a network. Step 402 includes receiving delivery location data at the delivery data server from the first client device that indicates a service address associated with a user of the first client device and a delivery location associated with the service address for receiving at least one delivery to the service address, wherein the delivery location data is generated at the first client device based on a user selection of the delivery location in relation to the captured image data corresponding to the delivery address. Step 404 includes processing the delivery location data at the delivery data server to direct the at least one delivery to the service address.

In an embodiment, the first client device generates the delivery location in relation to the captured image data corresponding to the delivery address based on a superposition of a delivery location icon on the captured image data corresponding to the delivery address. The delivery location data can include the superposition of the delivery location icon on the captured image data corresponding to the delivery address. The delivery location data can be sent to a delivery device associated with a delivery service person and wherein the delivery device displays the superposition of the delivery location icon on the captured image data corresponding to the delivery address. The captured image data corresponding to the delivery address can represent at least one of: a street view corresponding to the delivery address, and a sky view corresponding to the delivery address. The delivery location data can include GPS coordinates selected by the first client device. The delivery location data can be sent via the network to a drone delivery device that locates the delivery location based on the delivery location data. The service address can be a residential address and the delivery location associated with the service address can corresponds to a backyard location associated with the residential address.

FIG. 22 presents a flowchart representation of a method in accordance with an embodiment of the present disclosure. In particular, a method is presented for use with one or more of the functions and features described in conjunction with FIGS. 1-21. Step 410 includes capturing image data corresponding to the at least one delivery via a delivery device. Step 412 includes sending the image data corresponding to the at least one delivery to the first client device in conjunction with a delivery confirmation. In an embodiment, the delivery confirmation is sent to the first client device via an electronic message that includes the image data corresponding to the at least one delivery.

FIG. 23 presents a flowchart representation of a method in accordance with an embodiment of the present disclosure. In particular, a method is presented for use with one or more of the functions and features described in conjunction with FIGS. 1-22. Step 420 includes generating delivery image data of a delivery at a service address via an image capture device. Step 422 includes sending the delivery image data of the delivery at the service address and the tracking number to the delivery data server, wherein the delivery data server processes the delivery data to provide a delivery confirmation to a customer at the service address, wherein the delivery confirmation includes the delivery tracking number and the delivery image data.

FIG. 24 presents a flowchart representation of a method in accordance with an embodiment of the present disclosure. In particular, a method is presented for use with one or more of the functions and features described in conjunction with FIGS. 1-23. Step 430 includes receiving delivery location data generated by a client device that indicates a service address associated with a user of the client device and a delivery location associated with the service address for receiving at least one delivery to the service address.

FIG. 25 presents a flowchart representation of a method in accordance with an embodiment of the present disclosure. In particular, a method is presented for use with one or more of the functions and features described in conjunction with FIGS. 1-24. Step 440 includes displaying the captured image data corresponding to the delivery address on a display device of the delivery device.

In an embodiment, the delivery location data indicates the user selection of the delivery location by superposition of a delivery location icon on the captured image data corresponding to the delivery address, and the display device displays the superposition of the delivery location icon on the captured image data corresponding to the delivery address. The captured image data corresponding to the delivery address can include at least one of: a street view corresponding to the delivery address, and a sky view corresponding to the delivery address.

FIG. 26 presents a flowchart representation of a method in accordance with an embodiment of the present disclosure. In particular, a method is presented for use with one or more of the functions and features described in conjunction with FIGS. 1-25. Step 450 includes capturing a live image corresponding to the delivery address. Step 452 includes superimposing a delivery location icon on the live image corresponding to the delivery address, wherein a position of the delivery location icon on the live image is adjusted to correspond to the delivery location.

Figure 27:
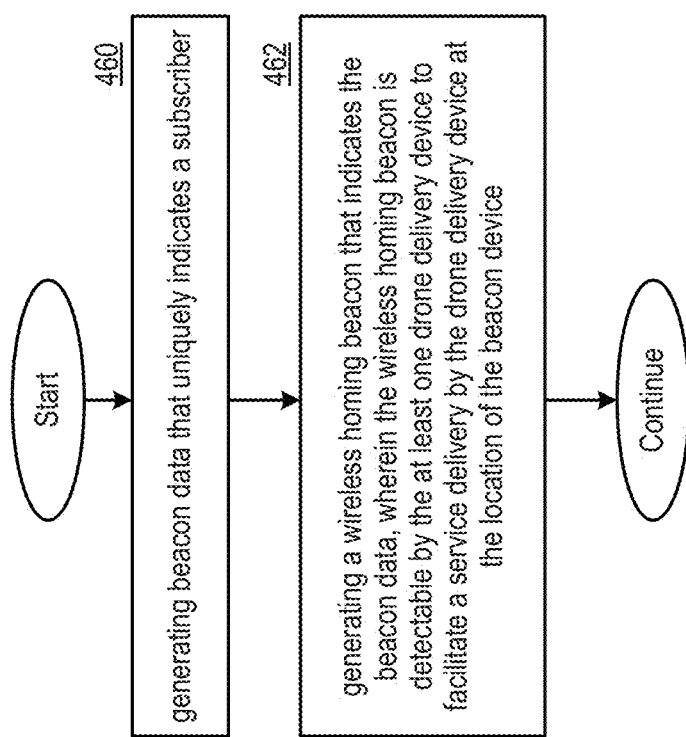
FIG. 27 presents a flowchart representation of a method in accordance with an embodiment of the present disclosure.

FIG. 27 presents a flowchart representation of a method in accordance with an embodiment of the present disclosure. In particular, a method is presented for use with one or more of the functions and features described in conjunction with FIGS. 1-26. Step 460 includes generating beacon data that uniquely indicates a subscriber. Step 462 includes generating a wireless homing beacon that indicates the beacon data, wherein the wireless homing beacon is detectable by the at least one drone delivery device to facilitate a service delivery by the drone delivery device at the location of the beacon device.

In an embodiment, generating the beacon data includes generating a pseudo random code sequence and wherein the beacon data includes the pseudo random code sequence. The beacon data can also, or in the alternative, include a rolling sequence of encryption codes and/or a low density parity check code.

In embodiments, the wireless homing beacon includes an infrared signal modulated via the beacon data, a visible signal modulated via the beacon data, and/or a radio frequency signal modulated via the beacon data.

The method can further include providing a delivery mat. The delivery mat can include a visible landing target and/or a visible two-dimensional code that uniquely indicates the subscriber.

It is noted that digital information whose content corresponds to any of a number of desired types (e.g., data, video, speech, audio, etc.) may generally be referred to as 'media' or 'data'.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A drone delivery device for use with a drone delivery service that facilitates a service delivery, the drone delivery device comprising:
   an aerial drone structure configured for service delivery via autonomous flight;
   a beacon receiver configured to receive a wireless homing beacon transmitted from a beacon device as a radio frequency (RF) signal that designates a desired delivery location at a service address selected by a subscriber, wherein the wireless homing beacon is modulated by beacon data that identifies the subscriber and includes a pseudo random code sequence generated by a code generator that is recognized by the drone delivery device to authenticate the delivery; and wherein the wireless homing beacon is received by the beacon receiver to facilitate the service delivery to the subscriber by the drone delivery device at the desired delivery location at the service address selected by the subscriber;

an image capture device configured to generate delivery image data captured after the service delivery; and a transmitter configured to transmit the delivery image data captured after the service delivery.

2. The drone delivery device of claim 1, wherein the code generator includes a linear feedback shift register that generates the pseudo random code sequence.

3. The drone delivery device of claim 1, wherein the code generator includes a security token module that generates a rolling sequence of encryption codes and wherein the beacon data includes at least one of the rolling sequence of encryption codes.

4. The drone delivery device of claim 1, wherein the beacon data further includes a low density parity check code.

5. The drone delivery device of claim 1, wherein the wireless homing beacon uniquely indicates the subscriber.

6. The drone delivery device of claim 1 wherein the beacon receiver includes a directional beam antenna that is utilized to home in on a location of the beacon device.

7. The drone delivery device of claim 6, wherein the beacon receiver utilizes the directional beam antenna to home in on the location of the beacon device based on an estimate of distance and direction.

8. The drone delivery device of claim 1, where the drone delivery device is guided by the wireless homing beacon to a delivery mat.

9. The drone delivery device of claim 1, wherein the drone delivery device sends the delivery image data to an access point at the service address that forwards the delivery image data received from the drone delivery device to a client device associated with the subscriber.

10. The drone delivery device of claim 1, wherein the delivery image data includes an image of a package at the location corresponding to the service delivery.

11. A method for use with a drone delivery device associated with a drone delivery service that facilitates a service delivery for service delivery via autonomous flight, the method comprising:

receiving, via a beacon receiver, receive a wireless homing beacon transmitted from a beacon device as a radio frequency (RF) signal that designates a desired delivery location at a service address selected by a subscriber, wherein the wireless homing beacon is modulated by beacon data that identifies the subscriber and includes a pseudo random code sequence generated by a code generator that is recognized by the drone delivery device to authenticate the delivery; and wherein the wireless homing beacon is received by the beacon receiver to facilitate the service delivery to the subscriber by the drone delivery device at the desired delivery location at the service address selected by the subscriber;

capturing, via an image capture device, delivery image data after the service delivery; and transmitting, via a transmitter, the delivery image data captured after the service delivery.

12. The method of claim 11, wherein the code generator includes a linear feedback shift register that generates the pseudo random code sequence.

13. The method of claim 11, wherein the code generator includes a security token module that generates a rolling sequence of encryption codes and wherein the beacon data includes at least one of the rolling sequence of encryption codes.

14. The method of claim 11, wherein the beacon data further includes a low density parity check code.

15. The method of claim 11, wherein the wireless homing beacon uniquely indicates the subscriber.

16. The method of claim 11, wherein the beacon receiver includes a directional beam antenna that is utilized to home in on a location of the beacon device.

17. The method of claim 16, wherein the beacon receiver utilizes the directional beam antenna to home in on the location of the beacon device based on an estimate of distance and direction.

18. The method of claim 11, where the drone delivery device is guided by the wireless homing beacon to a delivery mat.

19. The method of claim 11, wherein the drone delivery device sends the delivery image data to an access point at the service address that forwards the delivery image data received from the drone delivery device to a client device associated with the subscriber.

20. The method of claim 11, wherein the delivery image data includes an image of a package at the location corresponding to the service delivery.

* * * * *